(12) United States Patent
Bolik et al.

(10) Patent No.: US 11,392,393 B2
(45) Date of Patent: Jul. 19, 2022

(54) APPLICATION RUNTIME CONFIGURATION USING DESIGN TIME ARTIFACTS

(71) Applicant: SAP SE, Walldorf (DE)

(72) Inventors: Veit Bolik, Frankenthal (DE); Marcus Biemueller, Karlsruhe (DE)

(73) Assignee: SAP SE, Walldorf (DE)

( * ) Notice: Subject to any disclaimer, the term of this patent is extended or adjusted under 35 U.S.C. 154(b) by 512 days.

(21) Appl. No.: 15/891,710

(22) Filed: Feb. 8, 2018

(65) Prior Publication Data

US 2019/0243665 A1 Aug. 8, 2019

(51) Int. Cl.
G06F 9/445 (2018.01)
G06F 8/71 (2018.01)
G06F 8/70 (2018.01)
G06F 8/60 (2018.01)

(52) U.S. Cl.
CPC ............ *G06F 9/44505* (2013.01); *G06F 8/60* (2013.01); *G06F 8/70* (2013.01); *G06F 8/71* (2013.01); *G06F 2209/482* (2013.01)

(58) Field of Classification Search
None
See application file for complete search history.

(56) References Cited

U.S. PATENT DOCUMENTS

| | | | |
|---|---|---|---|
| 6,336,138 B1 * | 1/2002 | Caswell | H04L 41/12 345/440 |
| 9,779,121 B2 | 10/2017 | Bolik | |
| 2004/0148183 A1 * | 7/2004 | Sadiq | G06F 9/44505 719/330 |
| 2006/0059253 A1 * | 3/2006 | Goodman | G06Q 10/10 709/223 |
| 2006/0293934 A1 * | 12/2006 | Tsyganskiy | G06F 8/72 705/7.29 |
| 2008/0155518 A1 * | 6/2008 | Van Wyk | G06Q 10/06 717/142 |
| 2008/0312980 A1 * | 12/2008 | Boulineau | G06Q 10/06 705/7.13 |
| 2008/0320441 A1 * | 12/2008 | Ahadian | G06F 8/24 717/108 |
| 2009/0007054 A1 * | 1/2009 | Voss | G06F 9/451 717/101 |
| 2009/0113379 A1 * | 4/2009 | Sedukhin | G06F 8/35 717/104 |
| 2010/0114618 A1 * | 5/2010 | Wilcock | G06Q 10/06 705/7.37 |
| 2011/0067003 A1 * | 3/2011 | Slothouber | G06F 8/38 717/120 |

(Continued)

*Primary Examiner* — Jason D Mitchell
(74) *Attorney, Agent, or Firm* — Klarquist Sparkman, LLP

(57) ABSTRACT

Functionality configuration for applications is provided by a configuration service. An application may register with a configuration service for functionality configuration. A configuration model may be created for the application and deployed to the application for use in configuring the functionality and behavior of the application. The configuration model may be stored by the configuration service and maintained at the configuration service. The configuration model may be provided to multiple additional applications, or customized and provided to additional applications. Use of a single or related configuration models may standardize functionality and maintenance across related applications.

20 Claims, 20 Drawing Sheets

(56) References Cited

U.S. PATENT DOCUMENTS

| | | | |
|---|---|---|---|
| 2011/0283194 A1* | 11/2011 | Chen | G06F 8/61 |
| | | | 715/735 |
| 2012/0131554 A1 | 5/2012 | Mueller et al. | |
| 2012/0137227 A1* | 5/2012 | Gerken, III | G06F 8/38 |
| | | | 715/747 |
| 2015/0242200 A1* | 8/2015 | Niemoeller | H04L 47/783 |
| | | | 717/172 |
| 2015/0379056 A1 | 12/2015 | Bolik | |
| 2016/0132328 A1* | 5/2016 | Bouley | G06F 8/76 |
| | | | 717/121 |
| 2017/0039227 A1 | 2/2017 | Herbst et al. | |
| 2017/0140021 A1 | 5/2017 | Gopi et al. | |
| 2017/0171102 A1* | 6/2017 | Parker | H04L 67/02 |
| 2017/0337053 A1* | 11/2017 | Kumar | G06F 8/71 |

\* cited by examiner

APPLICATION RUNTIME CONFIGURATION USING DESIGN TIME ARTIFACTS

FIELD

The present disclosure generally relates to configuration information, and provision thereof, for software applications. Particular implementations relate to centrally developing configuration information for various applications, deployment of configuration information to various applications for use, and maintenance or monitoring of configuration information used by various applications.

BACKGROUND

Modern enterprise software applications are increasingly designed to have various functions controlled by configuration information or settings. Such applications may have complex prerequisites for the configuration, depending upon the functions for which they are built. Currently, configuration implementation is generally hard coded during development, which often makes the configuration dependent upon the chosen IDE and specific implementation technology (e.g., programming language or particular platforms or frameworks). Further, this practice isolates the configuration within a single application, and makes it difficult to add or modify the functionality of the application. This may lead to non-uniform implementation of configurations between applications and may limit the interoperability of such applications. With increasing interaction between applications, cross-application use of configuration information is increasingly important, especially for complex functions that span several applications. Accordingly, there is room for improvement.

SUMMARY

This Summary is provided to introduce a selection of concepts in a simplified form, which are further described below in the Detailed Description. This Summary is not intended to identify key features or essential features of the claimed subject matter, nor is it intended to be used to limit the scope of the claimed subject matter.

Techniques and solutions are described for dynamically configuring the runtime behavior or environment of a software application using configuration artifacts. Configuration artifacts can be, or can be developed from, various design time objects. In at least some cases, a less technically sophisticated user can select elements of pre-defined configuration artifacts to produce a configuration artifact that can produce desired runtime behavior. This process of dynamic runtime configuration can be referred to as "functionality configuration." In some implementations, configuration artifacts can be used with multiple, different applications (e.g., applications providing different runtime behavior or functionality, but which are based on at least certain shared configuration artifacts or components thereof). In some cases, functionality configuration can be provided by a service, which can be a centralized service, and can involve a repository, such as a centralized repository that may be used by multiple users, with multiple, different applications, or combinations thereof. Particular configuration services can be used in a cloud computing environment.

According to one method, an application may be registered with a centralized configuration service for configuration using the centralized configuration service, where the registration includes deployment instructions for deploying a configuration model to the application, and the configuration model includes one or more parameter types, parameter values, processing instructions, configuration objects, or a combination thereof. The configuration model may be created. The configuration model may be used to configure the functionality of the software application, such as using various configuration objects, configuration objects, or a combination thereof.

Creating the configuration model may include creating one or more configuration object schemas, the one or more configuration object schemas including one or more parameters, parameter types, parameter values, processing instructions, configuration objects, or a combination thereof. Creating the configuration model may further include creating one or more package templates based on the one or more configuration object schemas, the one or more package templates including at least one parameter, parameter type, parameter value, configuration object, or processing instruction. Creating the configuration model may further include generating a configuration package development module based on the one or more configuration object schemas and the one or more package templates. Creating the configuration model may further include creating one or more configuration packages via the configuration package development module, where the configuration model includes the one or more configuration object schemas, the one or more package templates, and the one or more configuration packages, and where the one or more configuration packages includes at least one parameter, parameter type, parameter value, configuration object, or processing instruction of at least one configuration object schema, at least one package template, or a combination thereof.

The configuration model may be stored in a repository. The configuration package may be deployed to the application based on the deployment instructions.

According to another method, one or more configuration object schemas are created, the one or more configuration object schemas including one or more parameters, parameter types, parameter values, processing instructions, or a combination thereof. One or more package templates are created based on the one or more configuration object schemas, the one or more package templates including one or more parameters, parameter types, parameter values, or processing instructions, or a combination thereof. A configuration package development module is generated based on the one or more configuration object schemas and the one or more package templates. A configuration package is created via the configuration package development module. The one or more configuration object schemas, the one or more package templates, or the configuration package are stored in a repository. The configuration package is deployed to the software application.

According to another method, configuration models that configure functionality in one or more applications are developed. Functionality configuration for the one or more applications based on the configuration models is coordinated. The configuration models are stored in a repository.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Figure 1A:
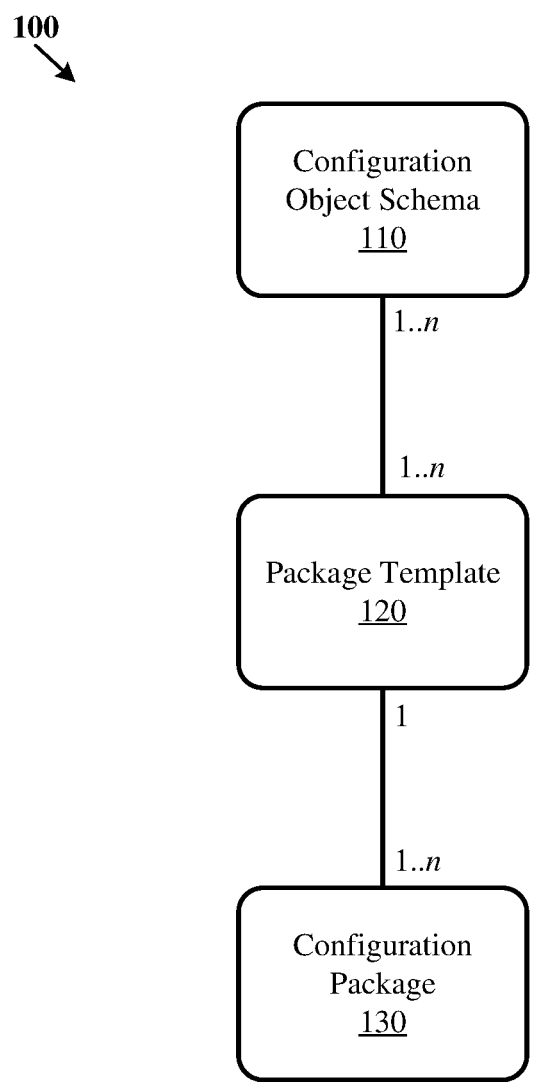
FIG. 1A illustrates the relationship of the configuration artifacts.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Configuration Service Overview

A configuration service may be provided to develop, deploy, distribute, monitor, or maintain runtime functionality for applications. The configuration service can carry out these functions using configuration artifacts. At least a portion of the configuration artifacts can be foundational, or parent, design time objects that are created, in some examples, by software developers. At least some configuration artifacts are derived artifacts that can typically be formed from such foundational configuration artifacts. In some cases, derived configuration artifacts can be created by less technically sophisticated users to provide desired runtime behavior, such as for new or changed use case scenarios. Thus, disclosed technologies can facilitate dynamic creation or modification (i.e., "configuration") of runtime behavior by less technically sophisticated users.

An application may be a software application, a portion of a software application, a system, a microservice, a collection of microservices, or any other form of software. An application may be a local application, a networked application, or a cloud application. The configuration service may operate in a network or in a cloud environment. The configuration service may also be used in software as a service (SaaS) applications or for platform as a service (PaaS) scenarios or applications. A configuration service may provide functionality configuration for applications across disparate networks or cloud environments.

A configuration service may manage configuration content for a variety of applications. Configuration content may include configuration models that contain the configuration for an application or additional data, such as various sets of text or various translations of text that may be shown in a user interface. Managing configuration content may include maintaining a library of configuration content. A configuration service may also distribute or deploy configuration content across a variety of applications. A configuration service may be used to centralize configuration content, or centralize development or distribution of configuration content. Thus, a configuration service may provide both configuration development functionality, deployment functionality, and run-time configuration maintenance and monitoring functionality.

A configuration service may further manage the lifecycle of a configuration model, or manage the configuration lifecycle for a particular application.

Example 2—Functionality Configuration

Functionality configuration generally includes configuring the functionality of an application based on one or more use cases. Functionality configuration may include configuration of an algorithm (or process for a use case) or configuration of parameters for an algorithm (or process for a use case). Functionality configuration may further include configuring content for an application, such as text displayed in a user interface to describe fields or provide a message to a user.

For example, an application may be used to analyze a person's credit and make a determination on how much financial credit to extend to the person, if any. This analysis may be performed by accepting data on the person (such as identifying information, employment information, and salary information), obtaining a credit score for the person, and, based on the person's data and credit score, determining how much credit and what type of credit to offer. Functionality configuration includes configuring this process or the data used in this process based on the functionality and data available in a configuration model for the application. In this example, functionality configuration may include options for which credit score to use (such as a standard credit score like FICO™ or a custom credit score) or what credit score value qualifies for what kind of loan or amount of loan. Functionality configuration could include configuring which data to collect on the person, such as asking for employment income and secondary income. Functionality configuration may include adding in steps to the process, such as obtaining additional credit information, such as number of credit cards the person currently has and their repayment status. Functionality configuration may include re-ordering the process, such as asking for minimal information about the person to get a credit score, then based on the credit score, asking for additional information, such as income.

A more complex scenario in this example may include authenticating the person's identity as part of the credit determination process. Functionality configuration may include adding such a step into the process, if the identity authentication is available in the configuration model being used. Identity authentication may be performed in a separate application, such as by a separate software application on a separate server or by a separate microservice within the same application. Thus, this scenario may span two (or more) applications. Using the same configuration model, or at least partially related configuration models, may improve interoperability and configuration across these applications.

Using a configuration model to configure functionality as described herein separates the coding of the applications from functionality configuration of the applications. This generally allows a user, such as an expert or key user, to reconfigure the functionality of the application to improve performance without requiring recoding of the application. For example, a key user may change the credit score threshold to qualify for a credit card, or which credit scores to use, or how to calculate a custom score, without requiring recoding of the application.

Another example may include an application for a sales process for a customer that is selling products from different categories through different distribution or sales channels. The customer may want to configure valid distribution channels for the different product categories, such as having dish washers sold only in stores, while hair dryers may be sold in stores and also ordered online and are shipped using a logistics service provider to the customer. Configuration may include which products are available, which products are in which categories, which distribution channels are available for each product category, and which distribution channels are actually used, which logistics service provide is used for which products or which categories, and so on. This may include further details, such as configuring the sales process to determine an optimal logistic service provide (of the configured available providers) dependent on the delivery address for an order. Further configurable logic examples may include configuring the sales process to offer different payment methods to different consumers. For instance, it may be that payment is required prior to shipping an expensive product to a new customer. Payment by customers with a positive payment history may be configured to be delayed and accepted after receipt of their order.

Example 3—Configuration Model

A configuration service may use a configuration model to configure applications registered with the configuration service. A configuration model may be application specific. A configuration model may also be re-used for additional or further applications. A configuration model may include the functions, objects, processes, or parameters that an application may use, and which a user may alter.

A configuration model may include one or more configuration artifacts. Configuration artifacts may include, for example, a configuration object schema, a package template, or a configuration package. A configuration object schema may include base requirements or form a base definition of a configuration model. That is, a configuration object schema can provide attributes, such as parameter types, parameter values, processing instructions, and the like, which can be used to configure the runtime behavior of a software application, and where all or a portion of the attributes of the configuration object schema can be incorporated into other configuration artifacts, such as package templates or configuration packages.

A package template may include all the base requirements or base definitions for a configuration model, and may include sets of options for functions, objects, processes, or parameters in the configuration model. A package template can include all or a portion of attributes of one or more configuration schemas. Thus, more complete or complex runtime functionality can be developed by incorporating multiple configuration object schemas, or selecting a subset of available attributes thereof. In at least some cases, attributes can include implementation level details (e.g., source code or components that can be used to produce source code or modify source code), where package templates or configuration packages incorporate, or reference, such implementation level details. Thus, a less technically sophisticated user can develop configuration artifacts such as package templates and configuration packages without having to specifically code functionality. The disclosed configuration artifacts can also facilitate the creation or modification of runtime behavior even by technically sophisticated users, by allowing for code reuse.

A configuration package may include all the base requirements or definitions for a configuration model, along with configuration data or selections for using the configuration model during run time of an application. Such configuration data or configuration content may be specific selections (such as user selections) of configurable options in a configuration model. For example, configuration data may include a selection of which attribute to use in a calculation from the multiple attributes made available for this calculation in the configuration model. In various implementations, a configuration template can explicitly include an object, or object attributes, or can include a reference to an object or object attribute. Typically, referenced objects and object attributes are explicitly incorporated into a configuration package even if they were referenced, but not incorporated, into a package template referenced or used by the configuration package. The configuration package can also include instructions or parameters for deploying the configuration package for an application, such as including file locations or settings information for a computing environment on which the application is deployed. Although package templates and configuration packages have been described as including attributes from configuration objects, in some cases package templates and configuration packages can include attributes that are not directly incorporated from a configuration object.

In a particular example, a configuration artifact may be implemented in JSON or XML. JSON and XML information from a parent artifact (e.g., a configuration object or a package template) may be included in a derived or child artifact (e.g., a package template or a configuration package). In at least some cases, a configuration service can include logic to automatically form a JSON or XML representation of a derived object, so that a user need not manually create the representation. Similarly, attributes not contained in parent artifact can be included in a configuration artifact by incorporating suitable JSON or XML code.

An application may have one or more configuration models, or one or more configuration artifacts. An application may use more than one configuration model concurrently, generally to configure separate functionality. Generally, an application using multiple configuration models will use models that do not overlap in functionality (i.e. do not configure the same functionality).

As described above, configuration artifacts may be interrelated, such as through dependencies or incorporation. FIG. 1A depicts the relationship 100 of configuration object schema artifacts 110, package template artifacts 120, and configuration package artifacts 130 in a configuration model.

Many configuration object schemas 110 may be related to many package templates 120. More specifically, a given configuration object schema 110 may be related to many package templates 120, and a given package template 120 may be related to many configuration object schemas 110. A package template 120 may also be related to many configuration packages 130. Generally, a given configuration package 130 is only related to a single package template 120.

A configuration object schema 110 may also be related to one or more other configuration object schemas 110. For example, configuration object schema B may be dependent upon configuration object schema A; thus, if configuration object schema B is used, configuration object schema A must be used as well (or incorporated). Similarly, a package template 120 may also be related to one or more other package templates 120.

A configuration model may be a specific relationship of configuration artifacts, or of more than one set of interrelated artifacts. Generally, a configuration model will have at least one configuration object schema 110, at least one package template 120, and at least one configuration package 130, which will generally be related as shown in FIG. 1A.

Figure 1B:
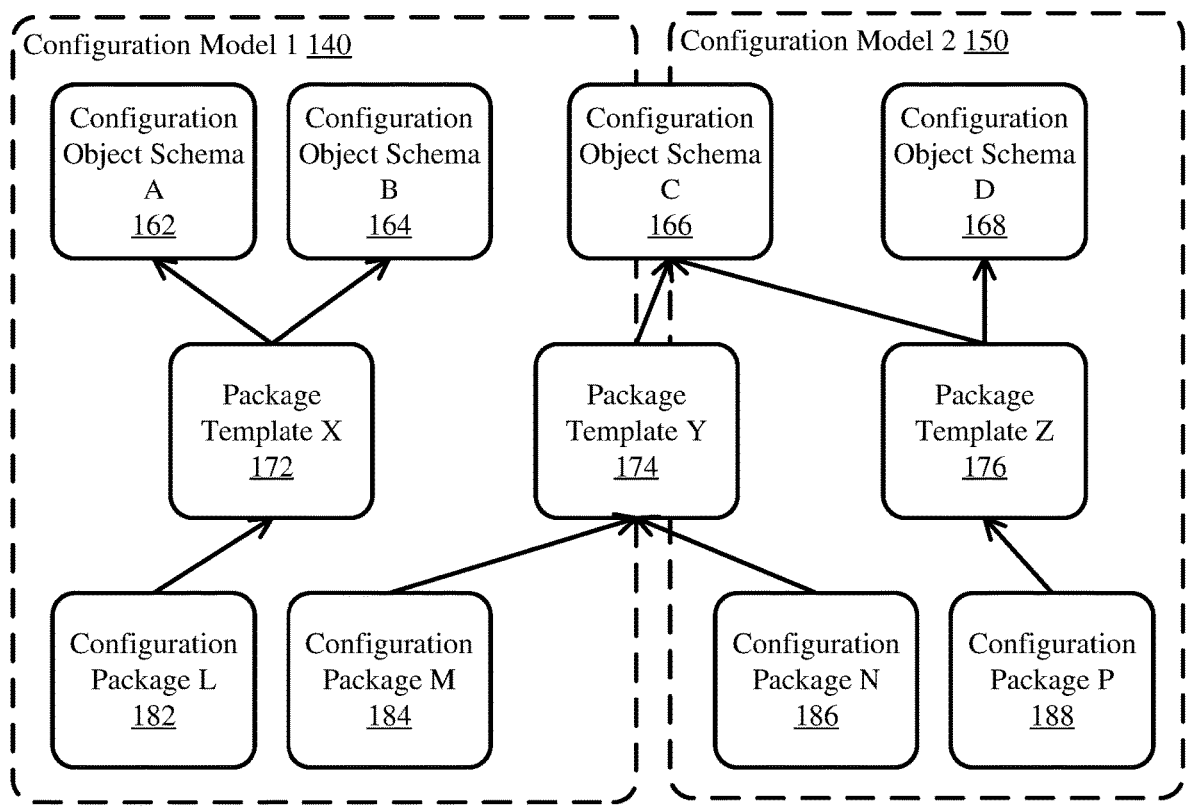
FIG. 1B illustrates two example configuration models with inter-dependent configuration artifacts.

Configuration artifacts may also be used across multiple configuration models. FIG. 1B illustrates two example configuration models, configuration model 1 140 and configuration model 2 150, with inter-dependent configuration artifacts.

Configuration model 1 140 includes configuration object schema A 162, configuration object schema B 164, and configuration object schema C 166. It further has package template X 172, which is related to configuration object schema A 162 and configuration object schema B 164, and package template Y 174, which is related to configuration object schema C 166. It also has configuration package L 182, which is related to package template X 172, and configuration package M 184, which is related to package template Y 174.

Configuration model 2 150 includes configuration object schema C 166 and configuration object schema D 168. It further has package template Y 174, which is related to configuration object schema C 166, and package template Z 176, which is related to configuration object schema C 166 and configuration object schema D 168. It also has configuration package N 186, which is related to package template Y 174, and configuration package P 188, which is related to package template Z 176. Thus, configuration object schema C 166 and package template Y 174 are both included in configuration model 1 140 and configuration model 2 150.

Example 4—Configuration Artifacts

Configuration artifacts (e.g., configuration objects defined according to a configuration object schema, package templates, and configuration packages) may contain configuration attributes (e.g., parameter types, parameter values, functions or other processing instructions, or other objects) that can be used in whole or part to define a configuration model. Configuration attributes may be given a type identifier.

Attributes, including attributes defined in a configuration object schema, can be implemented in various manners. Attributes can include definitions of data types (e.g., classes or other abstract data types, which can include data members, member functions, other components, and combinations thereof) that are used by an application. That is, for example, an application can include code that carries out various functions with respect to a data type, where the data type can be externally supplied by a disclosed configuration service, modified during application runtime, or a combination thereof (e.g., a configuration object can modify default application behavior). Attributes can also add or modify configuration settings of an application (e.g., a particular currency used for calculations, the values to be used as constants, etc.).

Configuration settings can include code elements, including stored data types, method, parameters, functions, routines, etc., that can already be present in an application, but which can be selectively activated or deactivated by a configuration object (including through the use of an appropriate attribute). For instance, a particular application process may be carried out using one or more stored methods, where an artifact specifies all or a subset of stored methods which should be used in the process. Similarly, an artifact can specify all or a subset of stored parameters which should be used in the process.

As described above, and as will be explained in further detail, attributes can be defined in XML or JSON. However, attributes may be defined, and deployed, in other manners. For example, attributes, or artifacts containing attributes, can be implemented as files, such as library or repository files that can be added to, or can replace, a library or repository used by a software application. The attributes can also be code modifications. For example, attributes can be code modifications that can be injected or otherwise added to code of an application, including replacing or removing existing code. In particular examples, such code modifications can be carried out as correction instructions, or as a process similar to seam injections, in the ABAP programming language.

Example 4—Configuration Object Schema

A configuration object schema may form all or part of the basis for a configuration model. A configuration object schema may contain configuration attributes, and optionally other information, such as meta tags.

One type of meta tag that may be included by a configuration object schema is a version identifier. A configuration object schema may also store information for how configuration attributes may be presented in a user interface; such information may be stored as special annotations in the configuration object schema and/or as part of a parameter type for an attribute. The configuration object schema may be used as a basis for a configuration package or for a development module for a configuration package. The configuration object schema may be defined by a developer or a user, such as a system administrator, or a technical user.

A configuration attribute may have a description. Further, a configuration attribute may have the same description in multiple languages for use in a user interface. The descriptions may be attributed to the configuration attribute through a configuration attribute identifier (ID).

A configuration attribute in a configuration object schema may have dedicated values or be restricted to only contain specific dedicated values. Such dedicated values for a configuration attribute may be defined in the configuration object schema or may be defined in a separate object or file. If defined in a separate object or file, the configuration object schema may be dependent upon that separate object or file. Such an additional file may be used to provide the valid values of the configuration attribute, such as in a user interface, a help menu, or log or error tracking. Such a file may be accessed during development or during runtime to validate or provide the values for the configuration attribute.

The configuration object schema may be used to build the dependencies within the configuration model. These dependencies may include dependencies between different configuration object schemas. Dependencies may be stored within a configuration object schema. A dependency may be a mandatory dependency, such that the use of one configuration object schema requires the use of the other configuration object schema defined in the dependency. A dependency may be an optional dependency, such that one configuration object schema does have a dependency with the other configuration object schema, but may still be used without the other configuration object schema. For example, an optional dependency may be related to some of the functionality within a configuration object schema, but not all the functionality.

A dependency may be unidirectional; for example, if configuration object schema A requires configuration object schema B, then use of A requires use of B, but use of B does not require use of A. A dependency may be reciprocal; for example, if configuration object schema A reciprocally requires configuration object schema B, then use of A requires use of B and use of B requires use of A.

A configuration object schema may include sequence information for the attributes or dependencies within it. Sequence information may indicate an order of preference or a hierarchy of the attributes or dependencies. For example, such an order of preference or hierarchy may be used as the order in which to perform an action on the attributes or dependencies. A configuration object schema may have more than one set of sequence information for separate sets of attributes or dependencies within the configuration object schema; such sequences may overlap with which attributes or dependencies they reference. Sequence information may be derived from dependencies, or may be independent of dependencies.

If a configuration object schema is changed, such as to add new configuration attributes or remove obsolete attributes, a new configuration object schema may be created with a new version number, based on the changed configuration object schema. A configuration object schema may define the configuration attributes needed for an application to run.

The configuration object schema may be stored by the configuration service. Further, the configuration service may store each version of a given configuration object schema, thereby having a history of the versions of a given configuration object schema. The configuration service may make the historical versions of a given configuration object schema available for use as needed, such as to roll-back an update in a system or to use a more compatible version in a different system.

Several additional entities may be complementary to a configuration object schema. These additional entities may be used to build the configuration object schema or used in conjunction with the configuration object schema. Such entities may include a file for value support (e.g. F4-Help), text and descriptions for attributes (and translations of such text and descriptions), user data for configurations related to a user, or error patterns for use in handling negative checks of the configuration object schema (such checks may be made by the configuration service or by an application using the configuration service).

Each configuration object schema may be a separate file, and belong to a single software application. A configuration object schema may store information identifying a software application with which it is used; this may include a version of the software application or a relationship indicator for the software application. Such information may include all software applications for which the configuration object schema is valid.

A configuration object schema may be defined or expressed in a JSON schema. A generic example, showing generic schema identifiers and a configuration object named "ConfigurationObject" with attributes similarly named, of such a schema is:

```
{
    "service": "myservice",
    "servicerelease": "1.0.0",
    "version": "1.0.0",
    "ConfigurationObject": {
        "attribute1": "parametertype1",
        "attribute2": "parametertype1 "
        "attribute3": "parametertype2 "
    }
}
```

A more specific example of two JSON-formatted configuration object schemas with dependencies (the second object lists a dependency to the first object "CurrencyCodes") is:

```
{
    "schema": {
        "type": "ConfigurationObject"
    },
    "service": "conversionservice",
    "servicerelease": "1.0.0",
    "version": "1.0.0",
    "dependencyhint": [ ],
    "dependency": [ ],
    "CurrencyCodes": {
        "CurrencyKey": "property_description",
        "IsoCurrencyCode": "property_description",
        "NumberOfDecimalPlaces": "property_description",
        "TextKey": "property_description",
    }
}
{
    "schema": {
        "type": "ConfigurationObject"
    },
    "service": "conversionservice",
    "servicerelease": "1.0.0",
    "version": "1.0.0",
    "dependency hint": ["CurrencyCodes"],
    "dependency": [ ],
    "CurrencyCombinationUsage": {
        "FromCurrency": "property_description",
        "ToCurrency": "property_description"
        "ExchangeRateType": "property_description",
        "ValidationDate": "property_description",
        "QuotationType": "property_description",
        "Spread": "property_description ",
```

```
        "AlternativeExchangeRateType": "property_description",
        "RatioOfFromCurrency": "property_description",
        "RatioOfToCurrency": "property_description",
        }
}
```

A configuration object schema may be extended beyond its definition by an additional, extending configuration object schema. This may be accomplished by defined exits within the configuration object schema, which may be configurable to point to additional configuration object schemas when triggered. An extendable configuration object schema may include a special tag or set of tags that can be used to extend the configuration object schema. These special tags may be used to incorporate additional attributes into the configuration object schema, without editing the original configuration object schema.

Generally, the lifecycle of a configuration object schema is managed by a configuration service. This may include providing development functionality for editing or maintaining configuration object schemas, such as described for a configuration development service. Such maintenance may further include checking a configuration object schema for errors or incompatible changes.

Example 5—Package Template

A package template may contain one or more configuration object schemas for a given software application or set of applications. In this way, multiple configuration object schemas are bundled together for use. The package template may contain copies of the included configuration object schemas themselves, or may contain references to the included configuration object schemas. A package template may store its own version identifier, and other meta tags. The package template may contain dependencies to other package templates. A package template may contain a maintenance sequence, which may include an order for resolving configuration object schema dependencies, for some or all of the configuration object schemas bundled in the package template.

A package template may be created to configure a particular function within an application, or for an application as a whole. In the credit analysis example, a package template may include the process for analyzing the person's credit, may include the calculation of a credit score for the person, or both. Creation of a package template may utilize dependency information found in configuration object schemas bundled in the package template. In some scenarios, a configuration object schema may be added automatically based on a dependency; in other scenarios, a configuration object schema may be suggested to be added based on a dependency. A package template may be defined by a developer or a user, such as a system administrator, a technical user, or a user-expert of the software scenario for which the package template is defined.

The package template may be stored by the configuration service. Further, the configuration service may store each version of a given package template, thereby having a history of the versions of a given package template. The configuration service may make the historical versions of a given package template available for use as needed, such as to roll-back an update in a system or to use a more compatible version in a different system.

A package template may be defined or expressed in a JSON schema. A generic example of such a template is:

```
{
    "version": "1.0.0",
    "dependencies": [ ],
    "scope": "public",
    "theService": {
        "ConfigurationObjectM": {
            "version": "1.0.0",
            "attribute1": "parametertype1",
            "attribute2": "parametertype1 ",
            "attribute3": "parametertype2 "
        }
        "ConfigurationObjectC": {
            "version": "1.0.0",
            "attribute1": "parametertype1",
            "attribute2": "parametertype1 ",
            "attribute3": "parametertype2 "
        }
    }
}
```

A more specific example of a JSON-formatted package template, building on the first configuration object schema provided earlier as an example, is:

```
{
    "schema": {
        "type": "PackageTemplate"
    },
    "Id": "<tenant?>.CCS.Codes1",
    "service": "conversionservice",
    "servicerelease": "1.0.0",
    "version": "1.0.0",
    "dependency hint": [ ],
    "dependency": [ ],
    "configurationobjectversion": ["1.0.0"],
    "CurrencyCodes": {
        "CurrencyKey": "property_description",
        "IsoCurrencyCode": "property_description",
        "NumberOfDecimalPlaces": "property_description",
        "TextKey": "property_description",
    }
}
```

Another specific example of a JSON-formatted package template, building on the two configuration object schemas provided earlier as examples, is:

```
{
    "schema": {
        "type": "PackageTemplate"
    },
    "Id": "<tenant?>.CCS.Combi1",
    "service": "conversionservice",
    "servicerelease": "1.0.0",
    "version": "1.0.0",
    "dependency hint": ["CurrencyCodes"],
    "dependency": ["CurrencyExchangeRate"],
    "configurationobjectversion": ["1.0.0"],
    "CurrencyCombinationUsage": {
        "FromCurrency": "property_description"
        "ToCurrency": "property_description"
        "ExchangeRateType": "property_description",
        "ValidationDate": "property_description",
        "QuotationType": "property_description ",
        "Spread": "property_description ",
        "AlternativeExchangeRateType": "property_description ",
        "RatioOfFromCurrency": "property_description",
        "RatioOfToCurrency": "property_description",
    }
}
```

Generally, the lifecycle of a package template is managed by a configuration service. This may include providing development functionality for editing or maintaining package templates, such as described in relation to the configuration development service or core configuration service described herein. Such maintenance may further include checking a package template for errors or incompatible changes, and resolve or confirm any dependencies.

Example 6—Configuration Package

A configuration package may contain the contents for the configuration of an application, such as the configuration of the functionality of the application. A configuration package may be used to configure a single function of the application, or it may be used to configure multiple functions of the application. An application with multiple functions may have a separate configuration package for each function, or a single configuration package for all functions, or some combination thereof. The modularization of configuration packages by function may be based on re-usability or maintainability of the configuration packages.

The structure of the configuration package may be defined by a package template. In this way, a package template is a basis for a configuration package. Version information for a package template may be stored in the configuration package. Such version information may be used to check for changes to configuration definitions and configuration semantics. Generally, a configuration package is the configuration model artifact that is used to configure a software application.

A configuration package may contain configuration attributes obtained through a package template. Configuration attributes in a configuration package generally contain content. Generally, a configuration package may contain all configuration attributes necessary for an application to run, or for a particular function of the application to be performed.

The configuration package may also contain a unique ID for the configuration package, dependencies with other configuration artifacts, scope information for the configuration package, and a list of services or functions that are configured by the configuration package. The scope information may control the visibility of this configuration package to software applications. A configuration package may store its own version identifier, and other meta tags.

A configuration package may be related to, or dependent upon, another configuration package. This may be in addition to any relation or dependencies to package templates.

A configuration package may be defined by a user, such as a developer, a system administrator, a technical user, a user-expert of the software scenario for which the package template is defined, or a key/advanced user. The execution or use of a configuration package may be directed by a user, such as one of the user examples previously listed.

The configuration package may be stored by a configuration service. Further, the configuration service may store each version of a given configuration package, thereby having a history of the versions of a given configuration package. The configuration service may make the historical versions of a given configuration package available for use as needed, such as to roll-back an update in a system or to use a more compatible version in a different system.

A configuration package may be defined or expressed in a JSON schema. A generic example, valid for multiple applications, of such a package is:

```
{
    "id": "specificID",
    "version": "1.2.2",
    "packagetemplateversion": "1.3.0",
    "dependencies": [ ],
    "scope": "public",
    "services": {
        "theService": {
            "attribute1": "value",
            "attribute2": "value",
            "attribute3": ["value", "value2", "value3", "value4"]
        }
    }
}
```

A more specific example of a JSON-formatted configuration package, building on the earlier provided first package template example, is:

```
{
    "schema": {
            "type": "ConfigurationPackage"
          },
    "Id": "<tenant?>.CCS.currencycodes.general"
    "version": "1.2.3",
    "packagetemplateversion": "1.0.0",
    "dependency": [ ],
    "scope": "public",
    "services": {
"CurrencyConversionService":{
"CurrencyCodes":
            [ {
        "CurrencyKey": "EUR3",
        "IsoCurrencyCode": "978",
"                    "NumberOfDecimalPlaces": "3",
            "TextKey": "23",
        },
        {
            "CurrencyKey": "EUR1",
            "IsoCurrencyCode": "978",
            "NumberOfDecimalPlaces": "1",
            "TextKey": "24",
        },
        {
            "CurrencyKey": "GBP",
            "IsoCurrencyCode": "826",
            "NumberOfDecimalPlaces": "3",
            "TextKey": "18",
        },
        {
            "CurrencyKey": "USD",
            "IsoCurrencyCode": "840",
            "NumberOfDecimalPlaces": "3",
            "TextKey": "65",
        }]
    }
   }
}
```

Another specific example of a JSON-formatted configuration package, building on the earlier provided second package template, is:

```
{
    "schema": {
        "type": "ConfigurationPackage"
        },
    "Id": "<tenant?>.CCS.currency.combinationusage"
    "version": "2.2.3",
    "dependency": [ ],
    "scope": "public",
    "packagetemplateversion": "1.0.0",
    "services": {
"CurrencyConversionService":{
"CurrencyCombinationUsage":
```

```
[{
        "FromCurrency": "EUR"
        "ToCurrency": "USD"
        "ExchangeRateType": "1",
        "QuotationType": "3 ",
        "Spread": "2,1 ",
        "AlternativeExchangeRateType": "3 ",
        "RationOfFromCurrency": "1,1",
        "RationOfToCurrency": "0,9",
        "ValidationDate": "01022017",
    }
    {
        "FromCurrency": "EUR"
        "ToCurrency": "GBP"
        "ExchangeRateType": "1",
        "QuotationType": "3 ",
        "Spread": "1,9 ",
        "AlternativeExchangeRateType": "3 ",
        "RationOfFromCurrency": "1,1",
        "RationOfToCurrency": "0,9",
        "ValidationDate": "01022017",
    }]
      }
    }
}
```

Generally, the lifecycle of a configuration package is managed by the configuration service. This may include providing development functionality for editing or maintaining configuration packages, such as described in a configuration development service. Such maintenance may further include checking a configuration package for errors or incompatible changes, and resolving or confirming any dependencies.

Example 7—Configuration Model Mapping

Figure 1C:
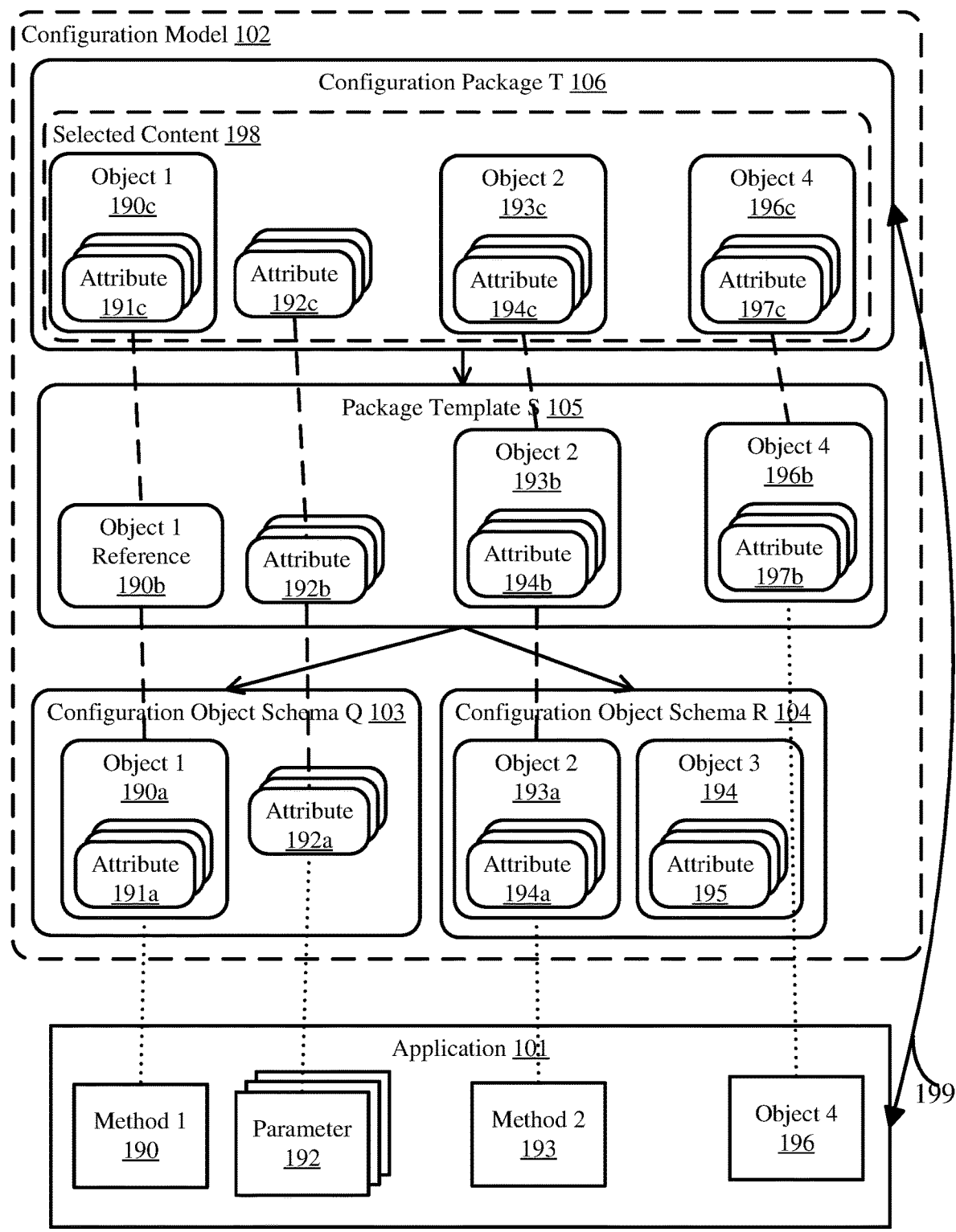
FIG. 1C illustrates an example configuration model with configuration artifacts mapped to an application.

FIG. 1C illustrates an example mapping between configuration artifacts 103, 104, 105, 106 in a configuration model 102 and between the configuration model 102 and an application 101. The application 101 may have several configurable components, such as a method 1 190, one or more parameters 192, a method 2 193, and an object 4 196 (e.g. a user interface display object, a class object, processing instructions, etc.). The application 101 may use 199 the configuration model 102, as implemented in the configuration package 106, for configuration.

The configuration model 102 may include a configuration package T 106 that is related to (e.g. depends from) a package template S 105 that is related to (e.g. depends from) a configuration object schema Q 103 and a configuration object schema R 104.

Configuration object schema Q 103 may include an object 1 190a, which may include one or more attributes 191a, and one or more attributes 192a. Object 1 190a may be mapped to configure (at least in part) method 1 190 in the application 101; the configuring may include the object attribute(s) 191a. The attribute(s) 192a in configuration object schema Q 103 may be mapped to configure parameter(s) 192 in the application 101.

Configuration object schema R 104 may include an object 2 193a, which may include one or more attributes 194a, and an object 3 194, which may include one or more attributes 195. Object 2 193a may be mapped to configure (at least in part) method 2 193 in the application 101; the configuring may include the object attributes 194a. Object 3 194 may not be mapped to configure anything in application 101. Alternatively, object 3 194 may be mapped to configure a component in the application 101, but may not be used as part of this configuration model 102 and instead used as part of a different configuration model.

Package template S 105 may include an object 1 reference 190b, which incorporates by reference object 1 190a from configuration object schema Q 103. Package template S 105 may also include one or more attributes 192b, incorporated from the attributes 192a in configuration object schema Q 103. Package template S 105 may also include object 2 193b, which may include attributes 194b, incorporated from object 2 193a and attributes 194a in configuration object schema R 104. Package template S 105 may also include an object not from a configuration object schema, such as object 4 196b, which may include attributes 197b. Object 4 196b may be mapped to configure (at least in part) object 4 196 in the application 101; the configuring may include attributes 197b.

Configuration package T 106 may include object 1 190c, which may be incorporated from configuration object schema Q 103 through the object 1 reference 190b in package template S 105. Configuration package T 106 may also include one or more attributes 192c, incorporated from the attributes 192b in package template S 105. Configuration package T 106 may also include object 2 193c, which may include attributes 194c, incorporated from object 2 193b and attributes 194b in package template S 105. Configuration package T 106 may also include object 4 196c, which may include attributes 197c, incorporated from object 4 196b in package template S 105. Further, these described components of configuration package T 106 may also have content 198 selected for each, such as by a user through a user interface, to configure their respectively mapped components in the application 101.

Configuration package T 106 may be used 199 by the application 101 to configure each of the respective application components using their corresponding (mapped) component in the configuration package and the selected content 198 for that component. The selected content 198 may be specific selections of options made available in the configuration model for a given object or attribute. This may be configuration data or configuration content, as described herein.

Objects or attributes may include parameters, parameter types, parameter values, configuration objects, processing instructions, metadata, or code fragments.

Example 8—Configuration Service Architecture

Figure 2A:
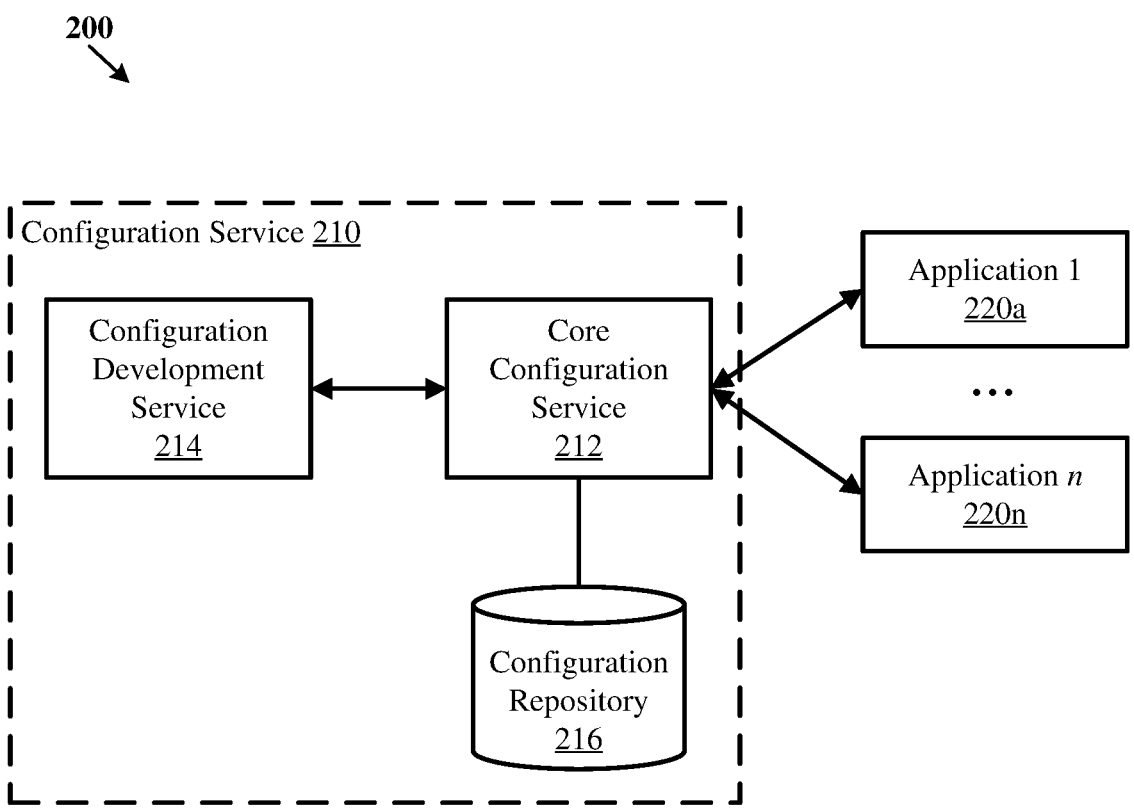
FIG. 2A is a schematic diagram depicting an architecture for a configuration service.

FIG. 2A depicts an architecture 200 for a functionality configuration service 210. The configuration service 210 may include a core configuration service 212. The core configuration service 212 may be connected to a configuration development service 214. The core configuration service 212 and the configuration development service 214 may communicate and exchange data or files between each other. The configuration development service 214 may provide the ability to develop a configuration model, which may be accomplished through user interfaces or OData services, for example.

The core configuration service 212 and the configuration development service 214 may be separate, or some or all of the configuration development service may be integrated with the core configuration service. The core configuration service 212 may be coupled to a configuration repository 216. The configuration repository 216 may be a separate database system accessible by the core configuration service 212. Alternatively, the configuration repository 216 may be integrated with the core configuration service 212. For example, the configuration repository 216 may be a database stored within the core configuration service 212.

Multiple applications 220a-n may use the configuration service 210 for functionality configuration (determining steps in a process or parameters to use in a process during run time), functionality configuration maintenance (storing or editing configuration models, or tracking versions of configuration models), or functionality configuration monitoring (monitoring use of configuration models to ensure correct technical or substantive functioning of the models). Such applications 220a-n may be registered with the configuration service 210. The core configuration service 212 may communicate with these applications 220a-n to provide or coordinate the requested services, such as configuration, maintenance, or monitoring. Any number of applications, such as Application 1 220a through Application n 220n, may use the core configuration service 212.

Example 9—Process for Providing Functionality Configuration

Figure 2B:
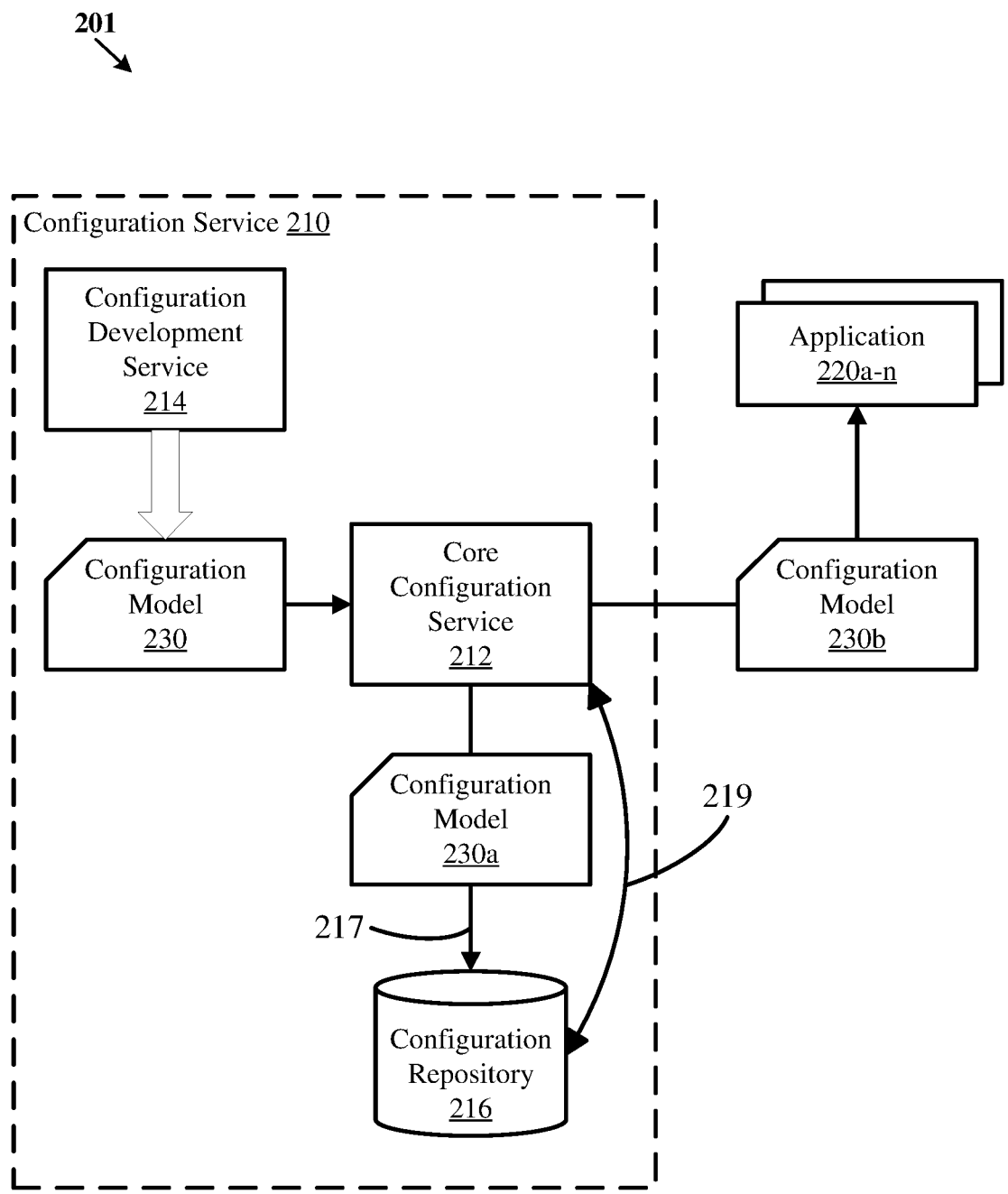
FIG. 2B illustrates a process for developing and providing a configuration model using the configuration service.

FIG. 2B illustrates a process 201 for developing and providing a configuration model using a configuration service 210. A configuration development service 214 may generate a configuration model 230. The configuration model 230 is provided to a core configuration service 212.

The core configuration service 212 may store 217 a configuration model 230a in a configuration repository 216. This configuration model 230a may be the configuration model 230 received directly from the configuration development service 214. In addition to receiving a configuration model 230 from the configuration development service 214, the core configuration service 212 may also obtain 219 configuration models from the configuration repository 216.

The core configuration service 212 may provide a configuration model 230b to an application or multiple applications 220a-n. This configuration model 230b may be a configuration model 230 received directly from the configuration development service 214, which may also be the configuration model 230a stored 217 in the configuration repository 216. Alternatively, the provided configuration model 230b may be a configuration model retrieved 219 from the configuration repository 216.

In this way, the configuration service 210 may develop, maintain, and distribute multiple configuration models to various applications. As shown in this process 201, a configuration model 230, 230a, 230b may also be a single configuration artifact.

Example 10—Core Configuration Service

Figure 3A:
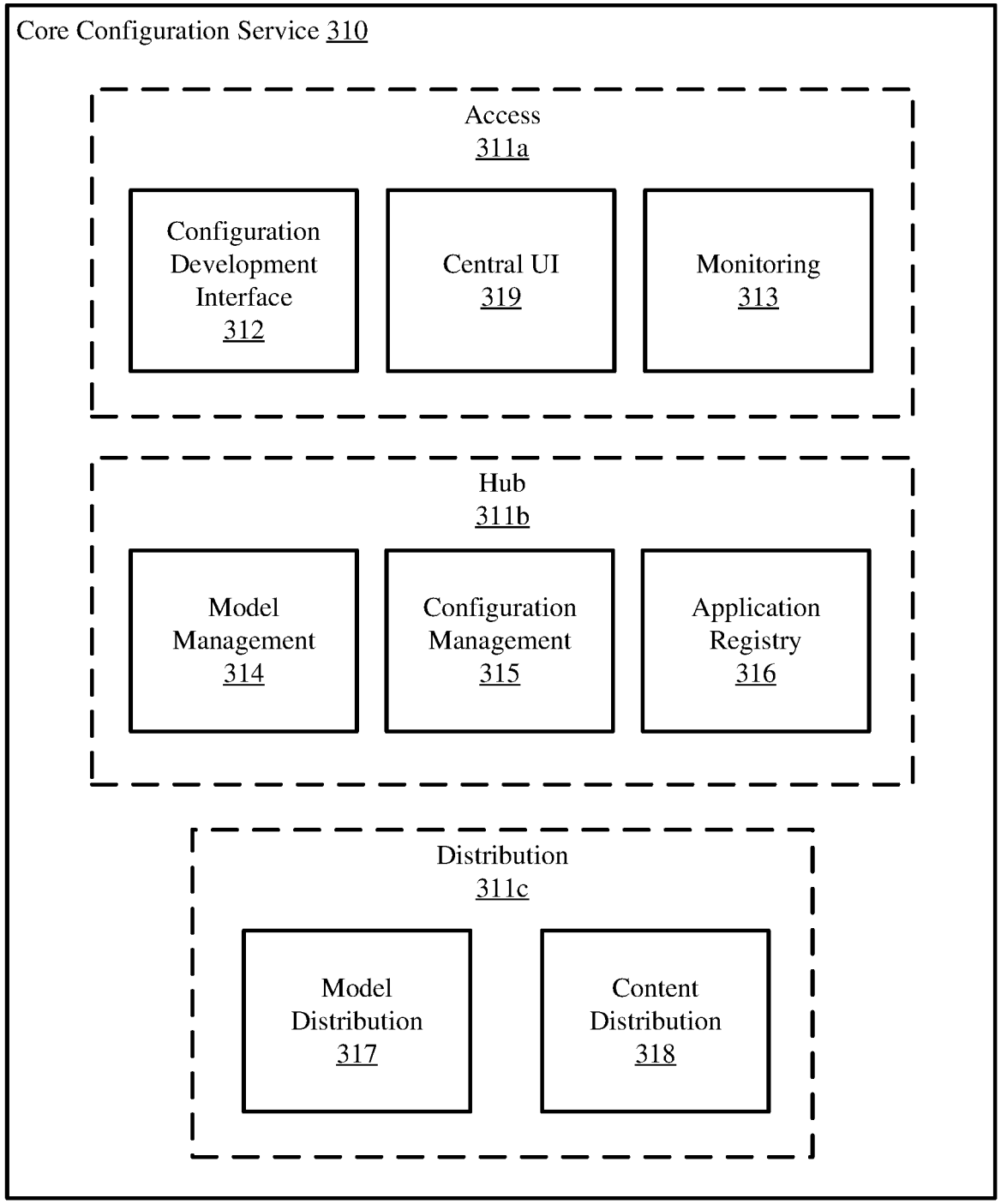
FIG. 3A depicts components of a core configuration service.

FIG. 3A depicts components of a core configuration service 310, which may be the core configuration service 212 in FIGS. 2A-B. A core configuration service 310 may have multiple blocks or layers 311a-c. For example, a core configuration service 310 may have one or more of an access layer 311a, a hub layer 311b, and a distribution layer 311c. Each layer may house certain components of the core configuration service 310. Alternatively, some or all of the components of a core configuration 310 service may be outside of any blocks or layers within the core configuration service.

An access layer 311a may have one or more of a configuration development interface 312, a central UI 319, and a monitoring component 313.

Figure 3B:
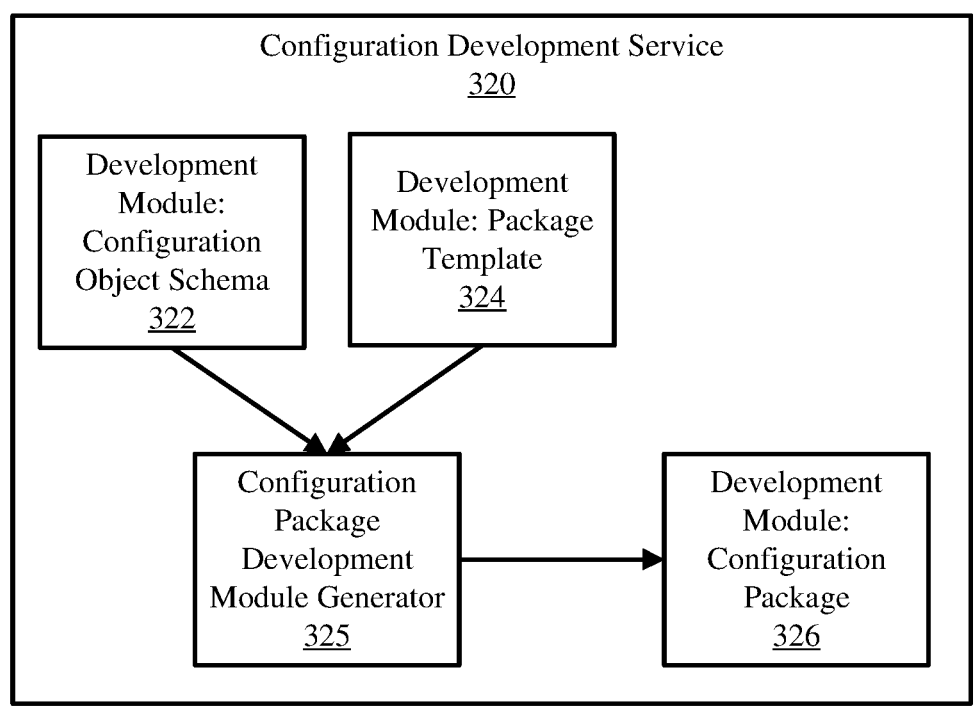
FIG. 3B depicts components of a configuration development service.

The configuration development interface component 312 may include functionality to interface with a configuration development service 320, shown in FIG. 3B. This may include functionality to send and receive data, such as configuration models or components of configuration models. This may further include integration of some or all of the components of the configuration development service 320. The configuration development interface 312 may also include user interfaces for maintaining configuration models, or accessing the configuration development service 320.

Figure 4:
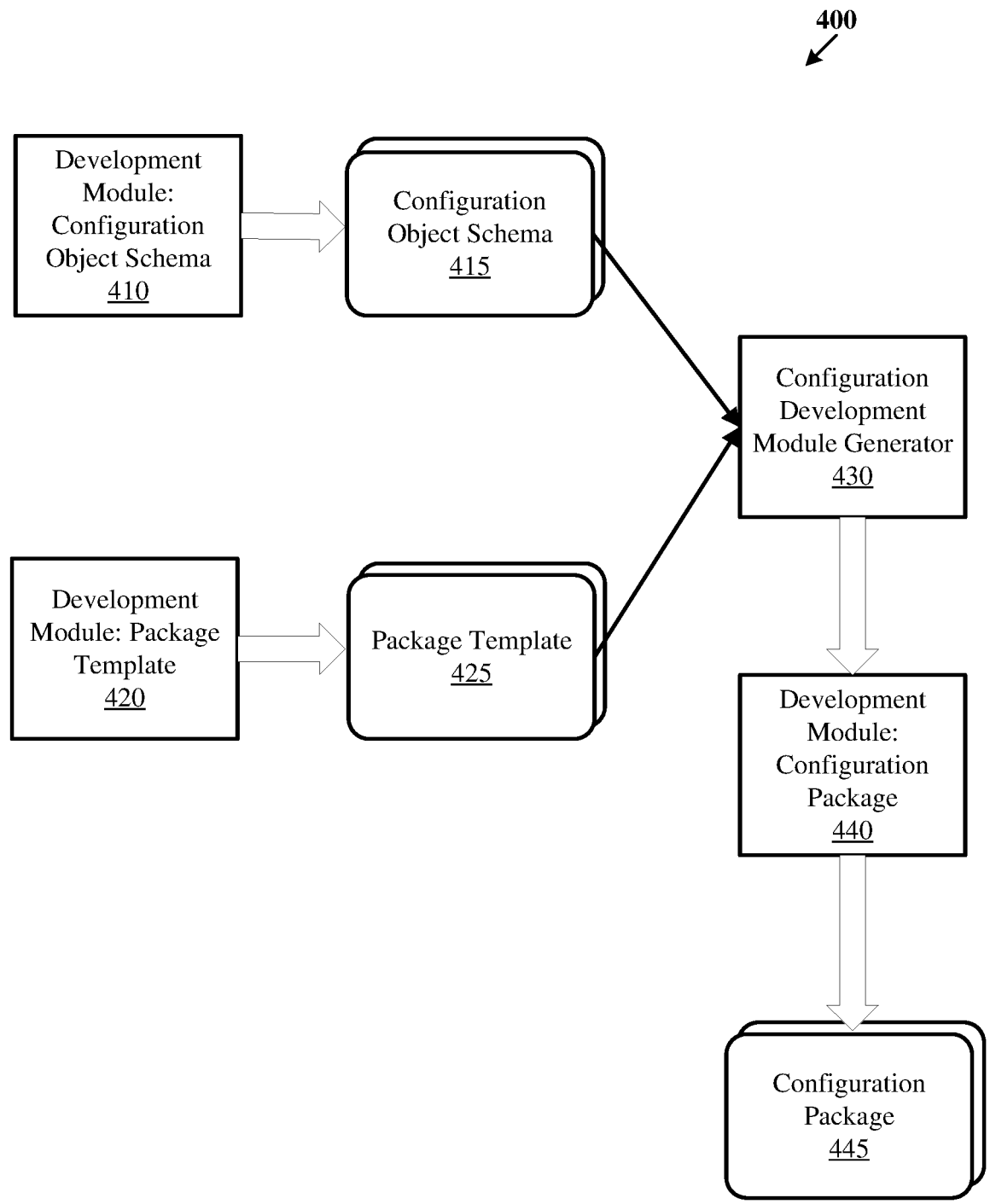
FIG. 4 illustrates a process and objects used to generate a configuration package development module.

The central UI component 319 may include a user interface by which a user may access the functionality of the configuration service; this may be a "main" user interface and may include multiple screens. The central UI 319 may be fully or partially integrated with the configuration development interface 312. The central UI 319 may be fully or partially integrated with the monitoring component 313. The central UI 319 may provide functionality for a user to register an application with the configuration service (in addition to an onboarding process as described herein) or edit or view application registration information. The central UI 319 may provide functionality for managing configuration models, or portions of configuration models, that are available to the user; this may include viewing available configuration models (including versions of configuration models), identifying which configuration models (and which versions) are currently in use by which applications, scheduling deployment or distribution of configuration models or portions of configuration models. The central UI 319 may include functionality to edit configuration models (or portions thereof), such as through the configuration development service as described herein, or access to tools or other interfaces for editing configuration models (or portions thereof), such as a link or a button to open a tool for editing a configuration artifact. In one scenario, attempting to access the configuration package development module, as described herein, via the central UI 319 may cause the configuration package development module to be generated as shown in FIG. 4 and described herein. Generally, functionality available to a user through the configuration service will be provided through the central UI 319.

The monitoring component 313 may include functionality to monitor deployed or distributed configuration models. This may include interfaces for accessing configuration models distributed to other applications. This may further include user interfaces for monitoring usage of deployed configuration models or content, reviewing monitoring data, or scheduling or maintaining monitoring activities.

A hub layer 311b may have one or more of a model management component 314, a configuration management component 315, and an application registry component 316.

The model management component 314 may manage configuration models received by the core configuration service 310. This may include storing the configuration models, such as in the configuration repository 216 of FIG. 2A. This may further include managing versions of models, maintaining a change log of configuration models, and retaining old versions of configuration models.

The configuration management component 315 may be used to manage or track configuration models, and to which applications they were provided. This may include configuration model versions and configuration content provided in or with the configuration model. In one embodiment, the configuration management component 315 may act as a cross-reference for the model management component 314 and the application registry component 316.

The application registry component 316 may be used to register applications with the configuration service, of which the core configuration service 310 is a part (as shown in FIGS. 2A-B). The application registry component 316 may maintain information needed by the configuration service to provide configuration models and content to registered applications. This may include APIs for the applications, application-specific information for configuration model development, endpoints for distribution or deployment (such as message locations or addresses, memory locations (e.g. process memory), network locations, file structure locations, methods or notices for deployment, etc.), controller implementations, message handling, saving/deleting/reading configuration functions, or references to related registered applications (e.g. for related microservices).

The application registry component 316 may be a library or database of the registered applications and data associated with the applications. An application may define further functionality configuration activities through the application registry 316, such as semantic checks or dependency checks on its configuration models to ensure the configuration model files are properly formatted and all necessary files are included. The core configuration service 310 may provide an onboarding process for self-registration of applications, which may be integrated with the application registry 316.

A distribution layer 311c may have one or both of a model distribution component 317 and a content distribution component 318. These components may be used to distribute or deploy one or more configurations models, configuration artifacts, or configuration content.

The model distribution component 317 may be used to distribute configuration models to applications. It may work with the application registry component 316 to determine how to distribute a configuration model to a particular application, such as to determine a location for delivering a configuration model. It may also communicate with an application to obtain the necessary information for distributing a configuration model to that application.

The content distribution component 318 may be used to distribute configuration content to applications. It may work with the application registry component 316 to determine how to distribute configuration content to a particular application, such as to determine a location for delivering configuration content. It may also communicate with an application to obtain the necessary information for distributing configuration content to that application.

The model distribution component 317 and the content distribution component 318 may work together to distribute configuration models and content, or may be integrated together.

Distribution, of either configuration models or configuration content, may be achieved as either a push distribution or a pull distribution. This may be determined based on the preference of the receiving application, or by a default selection. A push distribution puts the configuration model or content at the requested location for the receiving application. A receiving application may provide an API to the configuration service for providing configuration models or artifacts, or content. A pull distribution notifies the receiving application that the configuration model, configuration artifact, or content is available and where it is located. The receiving application may then obtain the configuration model or content itself from the specified location. Distribution may be accomplished as deployment, which is further described herein.

Distribution or deployment may be achieved through a two-stage process. First, the distributed configuration models, artifacts, or content may be provided as a draft. The receiving application may then perform any necessary checks, verification, or validation on the draft versions. The application may then notify the configuration service of the results. If no errors are found, then the configuration models, artifacts, or content may then be distributed again as production objects. If errors are found, this final distribution may not be performed.

User interfaces defined herein may provide fields or other selection or entry options for a user to develop, edit, or maintain configuration models, or portions of configuration models, or to work with configuration models, such as selecting which model to use for a given application or functionality in an application, deploying or scheduling for deployment a configuration model, registering an application with the configuration service, or any other user-interactive activity provided by the configuration service. Such fields may include text fields for entering code or text, drop-down menus or radio buttons for selecting options, spreadsheet fields with cells arranged into rows and columns for entering data, graphical icons representing functionality that are arrangeable (such as by drag-and-drop) to indicate a process or flow, or any other interface objects or widgets.

Example 11—Configuration Development Service

FIG. 3B depicts components of a configuration development service 320, which may be the configuration development service 214 in FIGS. 2A-B. The configuration development service 320 may have a development module for configuration object schemas 322, a development module for package templates 324, a development module for configuration packages 326, or a configuration package development module generator 325. The configuration development service 320 may be a loose collection of software that can perform a requisite task, or a collection of tightly integrated software components functioning as a single software application, or some combination thereof.

A configuration object schema development module 322 may be a software tool used to create a configuration object schema. For example, a configuration object schema development module 322 may be a text editor, an IDE, or a dedicated tool for developing configuration object schemas. In another embodiment, the configuration object schema development module 322 may be integrated into a core configuration service, such as the core configuration service 310 of FIG. 3A. A configuration object schema created by the development module 322 may be provided to the configuration package development module generator 325.

The package template development module 324 may be a software tool used to create a package template. For example, a package template development module 324 may be a text editor, an IDE, or a dedicated tool for developing package templates. In another embodiment, the package template development module 324 may be integrated into a core configuration service, such as the core configuration service 310 of FIG. 3A. A package template created by the development module 324 may be provided to a configuration package development module generator 325.

The configuration package development module generator 325 may use as input one or more configuration object schemas and one or more package templates; generally, the input configuration object schemas and input package templates will be interrelated. The development module generator 325 will read the input files and use the data and metadata stored therein to generate a configuration package development module 326 based on the input files. The development module generator 325 may be a separate software tool, or it may be integrated into a core configuration service, such as the core configuration service 310 of FIG. 3A.

The configuration package development module 326 may be a software tool used to create or maintain a configuration package. For example, a configuration package development module 326 may be a text editor, an IDE, a dedicated tool for developing package templates, or a custom generated user interface. A configuration package created by the development module 326 may generally be based on the configuration object schemas and package templates input to the development module generator 325. Maintenance of a configuration package through a configuration package development module 326 may include editing or updating a configuration package to alter the functionality configuration provided by the configuration package. This would change, at least in part, the functionality of the application that uses the configuration package, such as altering the process or changing the parameters used in the process. The configuration package development module 326 may be a separate software tool, or it may be integrated into a core configuration service, such as the core configuration service 310 of FIG. 3A.

Example 12—Example Detailed Configuration Service Architecture

Figure 3C:
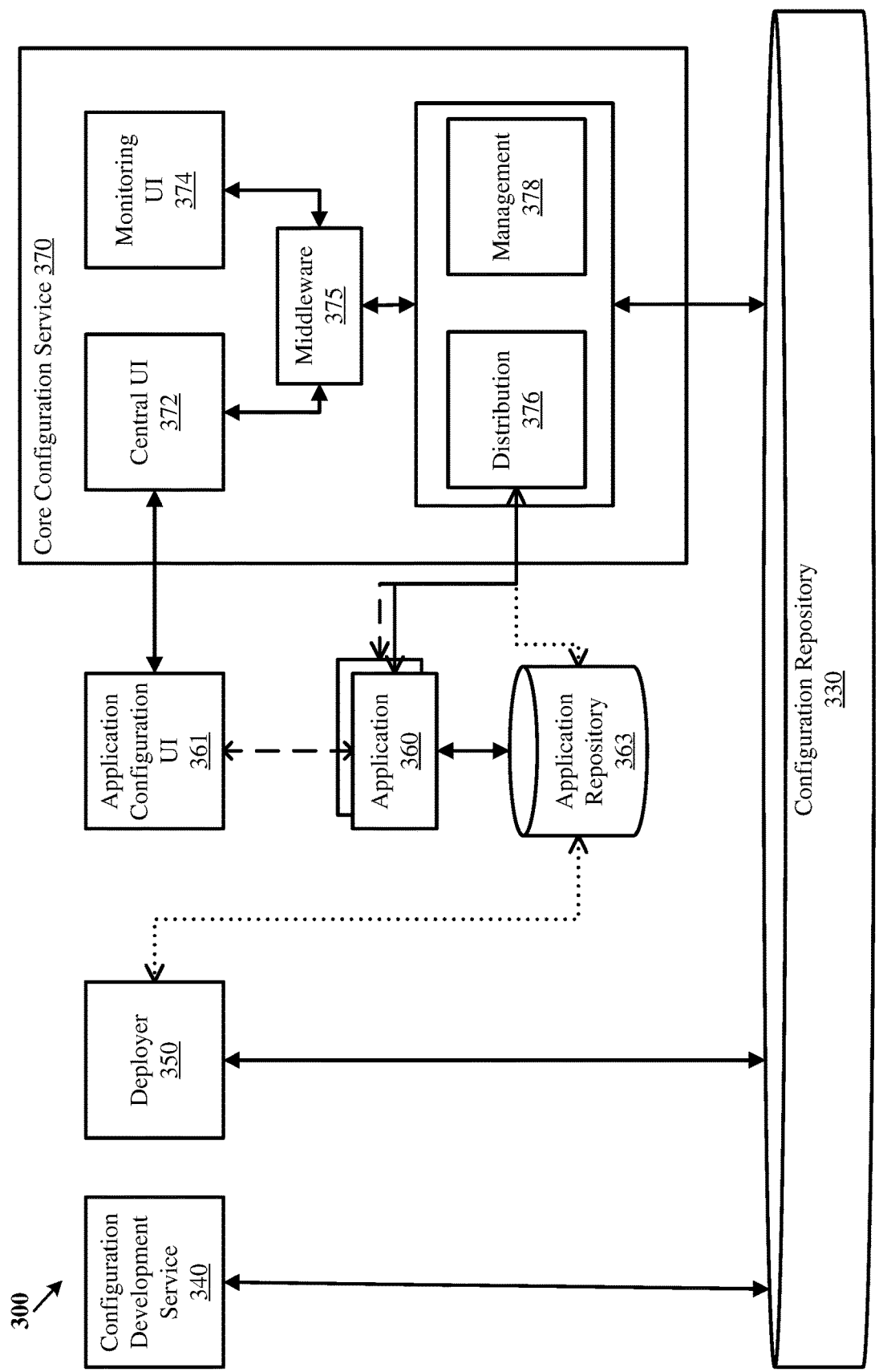
FIG. 3C depicts a schematic diagram illustrating an architecture for a configuration service and an application using the configuration service.

FIG. 3C illustrates a detailed architecture 300 for a configuration system and an application 360. The configuration system may include the configuration development service 340, the deployer 350, and the core configuration service 370. The configuration repository 330 may store configuration models or portions of configuration models, as described herein.

The configuration development service 340 may be the configuration development service 320 shown in FIG. 3B and otherwise described herein. The configuration development service 340 may be used to develop configuration models to configure one or more applications, such as application 360; generally, such development is done at design time (during the design phase). This may include software development tools that consist of user interfaces that allow for typing of software code, user interfaces that allow for graphical development of software code, other interfaces that allow for automatic code generations, or any other version of a software development tool. The configuration development service may store configuration models, or portions of configuration models, in the configuration repository 330, and may further retrieve stored configuration models, or portions of configuration models, for editing.

The deployer 350 may be used to deploy configuration models, or portions of configuration models, to an application 360. The deployer 350 may retrieve one or more configuration models, or portions of configuration models, from the configuration repository 330. The deployer may deploy a configuration model, or portion of a configuration model, by deploying the configuration model file or files to the application repository 263, as further described herein. This is generally accomplished at deployment time (during the deployment phase). The deployer 350 may be integrated with the core configuration service 370 or function as a separate service. The deployer 350 may deploy configuration model artifacts by direction through a user interface, through direction from another system such as the core configuration service 370, through scheduled deployments (which may be scheduled through a user interface at the deployer, through an interface with another system, or programmatically), or any other method of directing deployment.

The core configuration service 370 may be the core configuration service 310 shown in FIG. 3A and otherwise described herein. The core configuration service 370 may include any or all of a central UI 372, a monitoring UI 374, middleware 375, distribution component 376, and a management component 378.

The monitoring UI 374 may be the monitoring component 313 shown in FIG. 3A and otherwise described herein. The monitoring UI 374 may communicate or interact with the other components of the core configuration service 370 via middleware 375.

The central UI 374 may be the central UI component 319 shown in FIG. 3A and otherwise described herein. The central UI 374 may communicate or interact with the other components of the core configuration service 370 via middleware 375. The central UI 372 may act as a central entry point for the configuration service, and may enable a user to access one or multiple application configuration UIs, such as the application configuration UI 361. In this way, the central UI 372 may enable users to access application configuration UIs 361 without navigating or otherwise accessing the application, such as application 360. Further, the central UI 372 may reduce the need for many, separate or individual access points to the application configuration UIs.

The central UI 372 may also be coupled to, or in communication with, the application configuration UI 361. The application configuration UI 361 may be part of the configuration service. Alternatively, the application configuration UI 361 may be part of, or communicate with, the application 360. The application configuration UI 361 may provide user interface functionality for selecting a configuration model for the application 360 or configuring some or all of the application using a configuration model. Configuring the application using the configuration model can include entering or selecting values (e.g., via suitable user interface elements) for attributes of configuration artifacts, such as configuration objects and package templates, which values can be included in a configuration package that is deployed to configure an application. The application configuration UI 361 may also include user interface functionality deploying a configuration model to the application 360, registering the application with the configuration service, selecting versions of configuration model, or any other functionality associated with the configuration service.

The distribution component 376 may be the distribution layer 311*c* show in FIG. 3A and otherwise described herein. The distribution component 376 may communicate or interact with the central UI 372 or monitoring UI 374 via middleware 375. The distribution component 376 may access the configuration repository 330 to retrieve or store configuration models, or portions of configuration models. The distribution component 376 may distribute configuration models or configuration content, or portions thereof, to application 360, as otherwise described herein. This may include distribution directly to the application 360 or distribute to the application repository 363. The distribution component 376 may be fully or partially integrated with the deployer 350, or may direct the deployer in deployment, or may be directed by the deployer.

The management component 378 may be the hub layer 311*b* shown in FIG. 3A and otherwise described herein. The management component 376 may communicate or interact with the central UI 372 or monitoring UI 374 via middleware 375. The management component 376 may access the configuration repository 330 to retrieve or store configuration models, or portions of configuration models.

The application 360 may be a single executable application, or may be an application comprised of multiple, separately running or functioning executables, such as a collection of microservice. For example, in the scenario where the application 360 is a collection of microservice, the distribution component 376 may distribute to some or all of the separate microservices in application 360. This may be done based on requirements of the separate microservices in the application 360 or requirements of the configuration model (or portion thereof) being deployed. For example, a single configuration model may be used to configure one microservice, while a different configuration model may be used to configure multiple microservices, and so may be distributed (or deployed) to each.

Example 13—Configuration Package Development Module

FIG. 4 illustrates a process 400 and objects used to generate a configuration package development module 440, which may be the configuration package development module 326 in FIG. 3B. A configuration object schema development module 410, which may be the configuration object schema development module 322 in FIG. 3B, provides one or more configuration object schemas 415. A package template development module 420, which may be the package template development module 324 in FIG. 3B, provides one or more package templates 425. The configuration object schemas 415 and package templates 425 are provided as input to a configuration development module generator 430, which may be the configuration package development module generator 325 in FIG. 3B. Generally, the configuration object schemas 415 and package templates 425 provided to the configuration development module generator 430 are related or dependent.

The configuration development module generator 430 reads the configuration object schemas 415 and package templates 425 and uses the configuration attributes and other information found therein to generate a configuration package development module 440 specifically for developing configuration packages based on the configuration attributes, etc. found in the configuration object schemas 415 and package templates 425. In this way, a configuration package development module 440 is unique to developing configuration packages 445 for specific sets of configuration information.

Figure 5A:
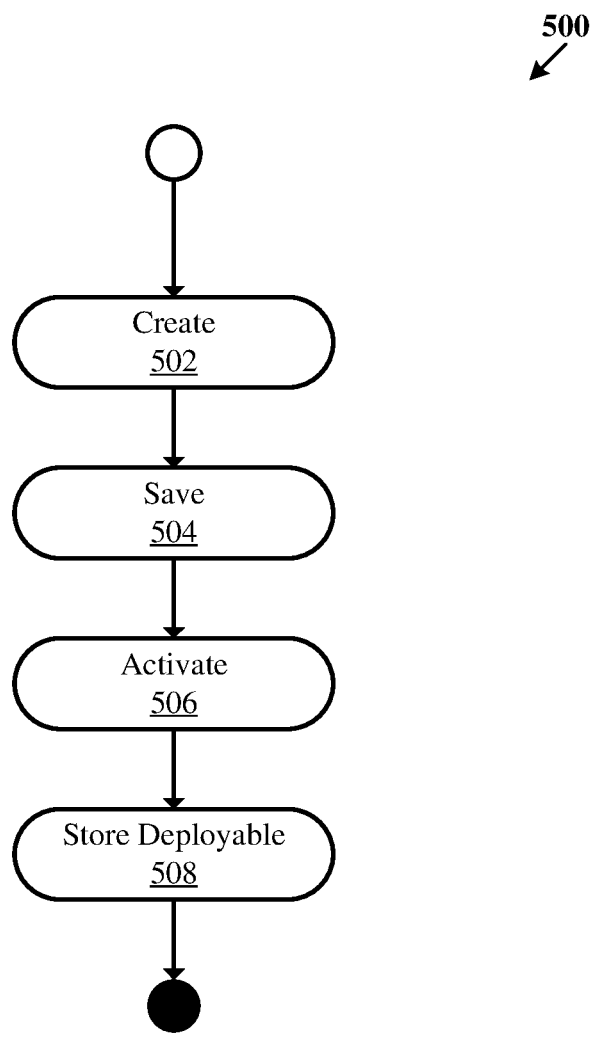
FIG. 5A is a flowchart illustrating a process for creating a configuration object schema.
Figure 5B:
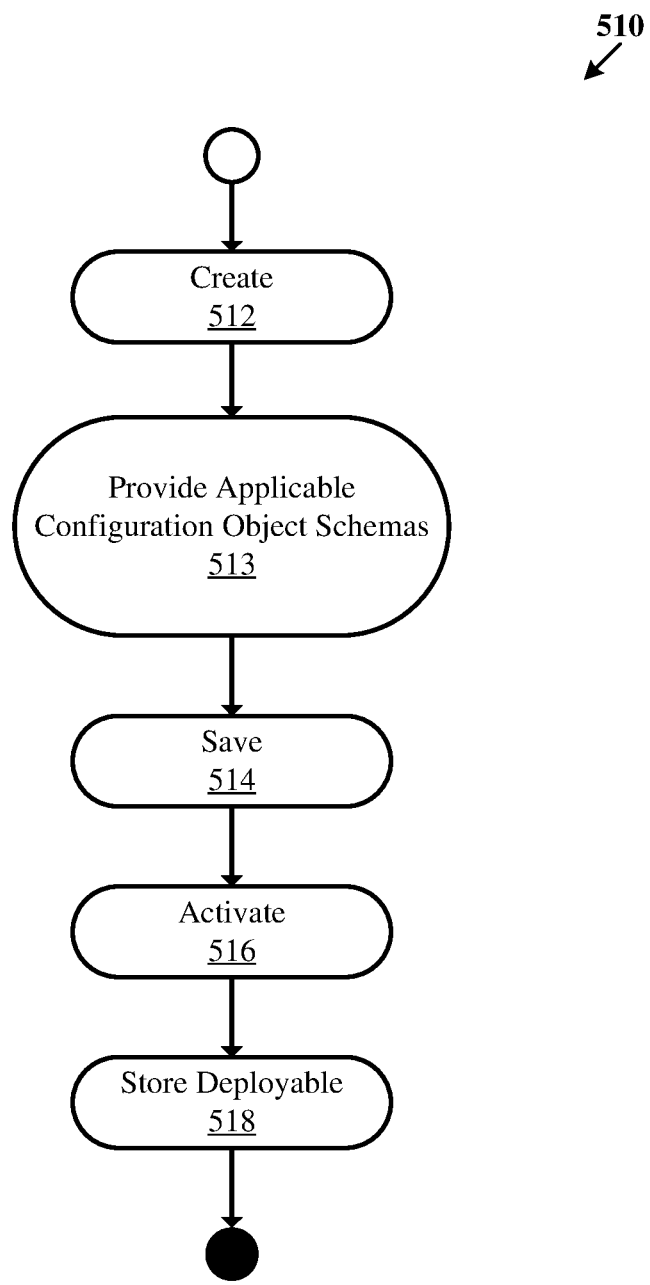
FIG. 5B is a flowchart illustrating a process for creating a package template.
Figure 5C:
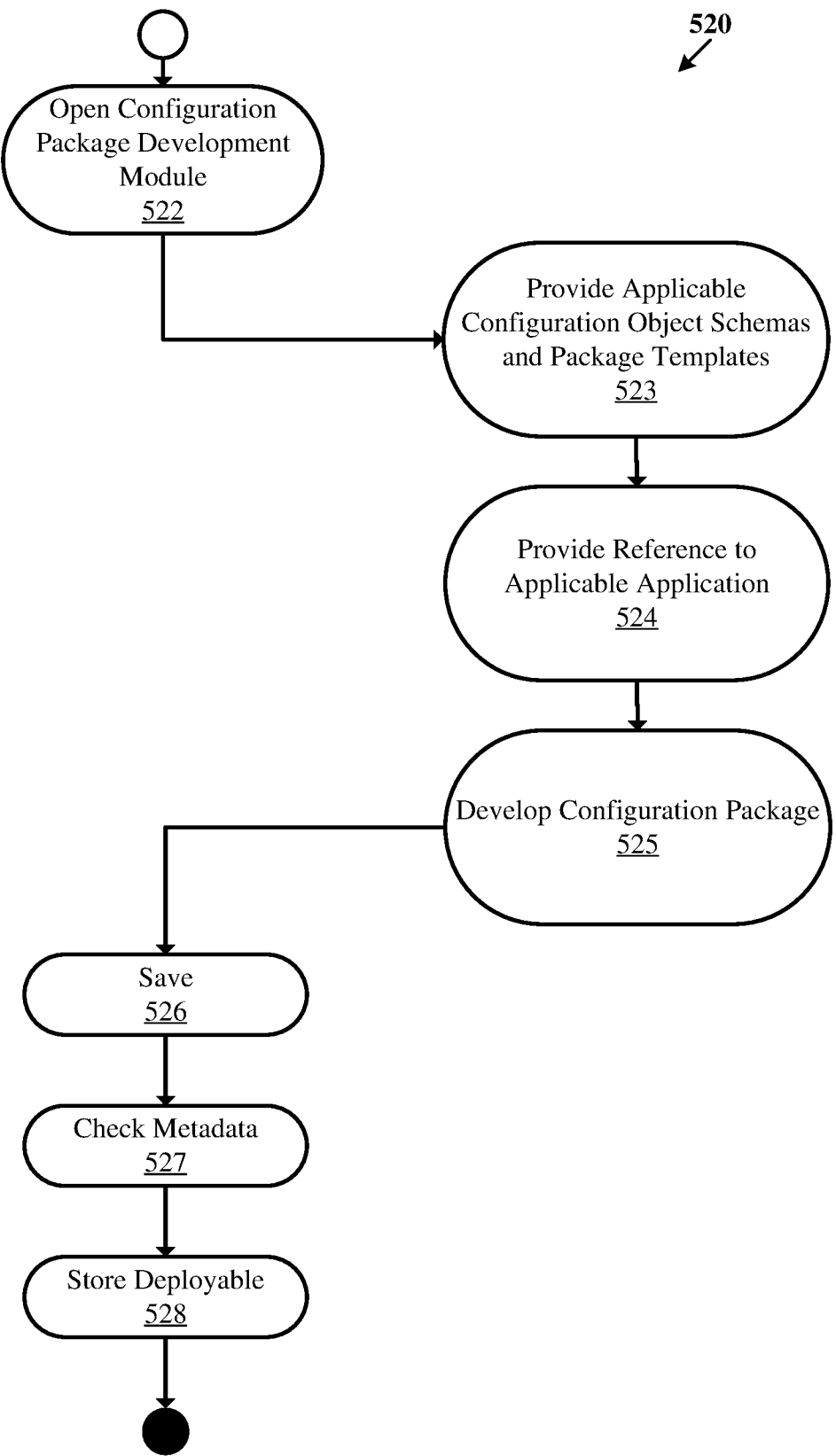
FIG. 5C is a flowchart illustrating a process for creating a configuration package.

The configuration package development module 440 may be provided to develop, edit, or maintain a configuration package, which may include implementing the configuration package development process 520 in FIG. 5C. In one embodiment, the configuration package development module 440 may be a generated user interface or a developed (dedicated) user interface. Such a generated user interface may provide fields or other selection or entry options for a user to develop, edit, or maintain a configuration package. Such fields may include text fields for entering code or text, drop-down menus or radio buttons for selecting options, spreadsheet fields with cells arranged into rows and columns for entering data, graphical icons representing functionality that are arrangeable (such as by drag-and-drop) to indicate a process or flow, or any other interface objects or widgets. A generated configuration package development module 440 may be re-generated if any of the configuration artifacts, such as a configuration object schema 415 or a package template 425, upon which it depends are edited or updated.

The configuration package development module may also provide automatic code-generation functionality to automatically generate a configuration package. Such functionality may be provided as a batch process, with inputs as configuration object schemas and package templates for example, or as automatic code-generation through other development tools in the configuration development service described herein.

The configuration package development module may also automatically provide relationships to the correct package templates for a configuration package. This module may also check the validity of a configuration package template by evaluating meta tags for correct versions, resolving dependencies, and confirming the correct or expected content for any specified applications for the configuration package.

Example 14—Configuration Artifact Creation Processes

FIG. 5A is a flowchart illustrating a process 500 for creating a configuration object schema. The process 500 begins with creating a new configuration object schema at 502. Generally, this is done through a configuration object schema development module, as described herein. This may also include opening an existing configuration object schema for editing. Creating a new configuration object schema at 502 may include developing or drafting the configuration object schema framework syntax and adding in the requisite information, such as configuration attributes and metadata tags or attributes, or other information as described herein.

Once the configuration object schema is created, the configuration object schema is saved at 504. Saving at 504 may include storing in local storage, such as at a configuration object schema development module or at a core configuration service, as described herein. The configuration object schema may then be activated at 506, which may include setting an indicator that the configuration object schema is available for use or passing the configuration object schema to a core configuration service for use. Activating the configuration object schema at 506 may include putting the configuration object schema in a predefined or accessible file location, such as a file location accessed and read by the application for which the configuration object schema is activated. Activating the configuration object schema at 506 may be performed to make the configuration object schema available for development, or for use during run-time. Activation 506 may include placing the configuration object schema on a list displayed to a developer or user of available configuration object schemas. A configuration object schema may then be stored at 508 as a deployable configuration artifact. This may include storing the configuration object schema in a configuration repository, as described herein.

A configuration object schema may be created by a developer or programmer, as it generally forms a basis for a configuration model. This may be accomplished separately from the run time of the configuration service.

FIG. 5B is a flowchart illustrating a process 510 for creating a package template. The process 510 begins with creating a new package template at 512. Generally, this is done through a package template development module, as described herein. This may also include opening an existing package template for editing. Creating a new package template at 512 may include developing or drafting the package template framework syntax and adding in the requisite information, such as configuration attributes and metadata tags or attributes, or other information as described herein.

Creating a new package template at 512 may include providing applicable configuration object schemas at 513. Generally, a package template is related to, or dependent upon, one or more configuration object schemas. Information from such configuration object schemas may be integrated into the package template, or may provide some or all of the framework for the package template.

Once the package template is created at 512 and the applicable configuration object schemas provided at 513, the package template is saved at 514. Saving at 514 may include storing in local storage, such as at the package template development module or at a core configuration service, as described herein. The package template may then be activated at 516, which may include setting an indicator that the package template is available for use or passing it to a core configuration service for use. A package template may then be stored at 518 as a deployable configuration artifact. This may include storing the package template in a configuration repository, as described herein.

A package template may be created by a developer or programmer, as it generally forms a basis for a configuration model, in conjunction with any configuration object schemas it is related to. This may be accomplished separately from the run time of the configuration service.

FIG. 5C is a flowchart illustrating a process 520 for creating a configuration package. The process 520 begins with creating a new configuration package by opening the configuration package development module at 522. This may also include opening an existing configuration package for editing. Opening the configuration package development module at 522 may include providing applicable configuration object schemas and package templates at 523 to generate the configuration package development module, as described herein. Generally, a configuration package is related to, or dependent upon, one or more configuration object schemas or one or more package templates. Information from such configuration object schemas and package templates may be integrated into the configuration package, or may provide some or all of the framework for the configuration package, at 523.

Opening the configuration package development module at 522 may include providing a reference to any applicable applications for the configuration package at 524. Such a reference may include information necessary to develop the configuration package for that applicable application. Such information may include, for example, a specific list of functions to include in the configuration package or specific descriptions for fields in a user interface of the applicable application that the configuration package may use. This information may be included in the reference, or the reference may be to a file containing such information.

Once the configuration package development module is generated and open at 522, with applicable information from configuration object schemas or package templates at 523, or applications at 524, the configuration package is developed at 525. Developing the configuration package may include drafting the configuration package and adding in the requisite information, such as configuration attributes and metadata tags or attributes, configuration content for the various attributes and metadata, or other information as described herein.

Once the configuration package is developed at 525, the configuration package is saved at 526. Saving at 526 may include storing in local storage, such as at the configuration package development module or at a core configuration service, as described herein. The metadata for the configuration package may then be checked or validated at 527, which may include resolving all dependencies or confirming that all necessary information has been included in the configuration package. A configuration package may then be stored at 528 as a deployable configuration artifact. This may include storing the configuration package in a configuration repository, as described herein.

A configuration package may be created by a developer or programmer. This may be accomplished separately from the run time of the configuration service. Further, a configuration package may also be developed by a key user familiar with the functionality scenarios for which the configuration package provides configuration. Such a key user may be a user of the applicable application and not a developer or programmer. This may occur at run time of the configuration service as well.

Example 15—Deployment Processes

Figure 6A:
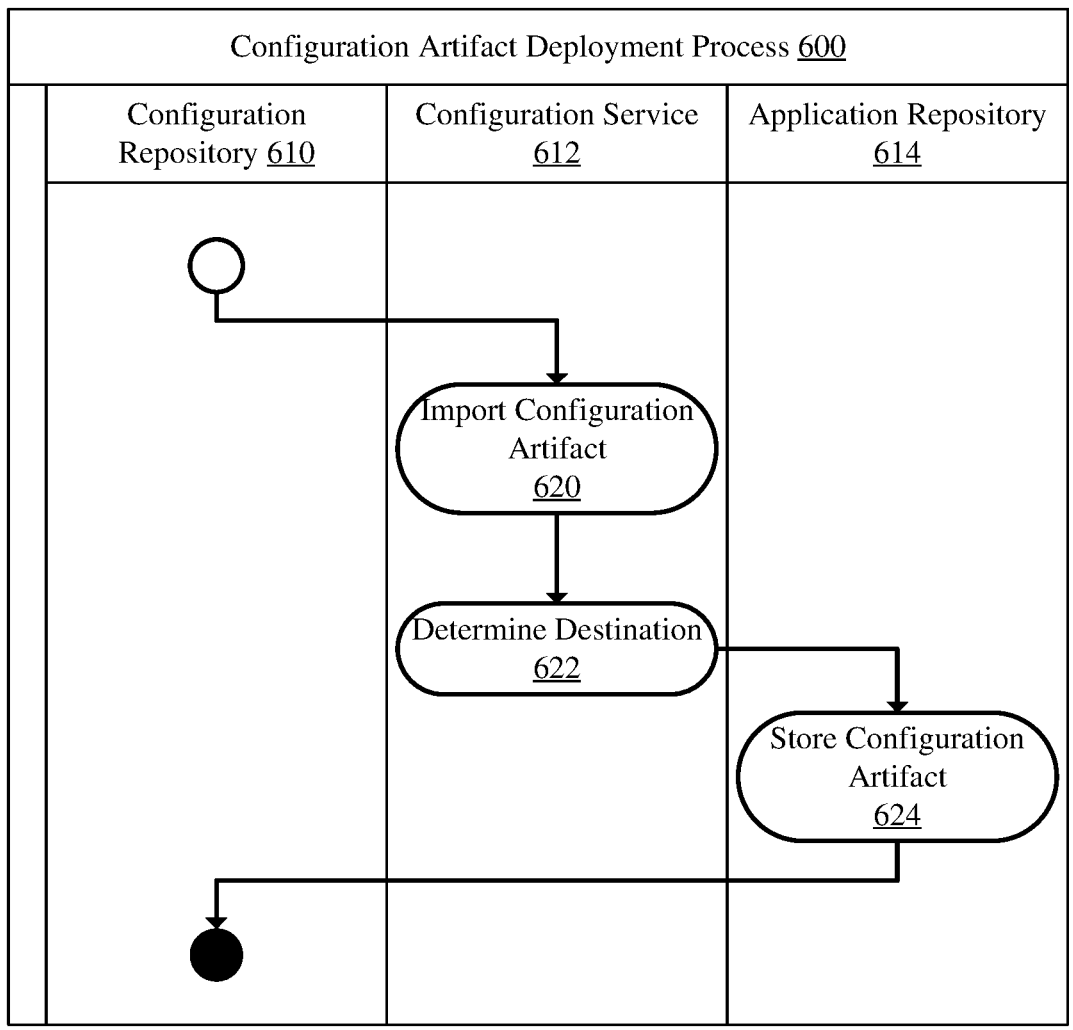
FIG. 6A is a flowchart illustrating a configuration artifact deployment process.

FIG. 6A is a flowchart illustrating a configuration artifact deployment process 600. Deployment of a configuration artifact to an application begins in a configuration repository 610 where the configuration artifact is stored. A configuration service 612 imports the configuration artifact at 620 for use in deployment. Next, the configuration service 612 determines the destination for the configuration artifact at 622. This may include consulting an internal registry for the location for the configuration artifact at the application. Alternatively, it may include querying the application itself to determine the location to deploy the configuration artifact. The configuration service then stores the configuration artifact at 624 in the determined application repository 614. Alternatively, the configuration service 612 may store the configuration artifact at 624 in a local location of the configuration service for use. The repository 614 may be a network location, a file location, a database, a communication message receiver, a memory space, or some other receiving location.

Generally, the process 600 ends once the configuration artifact is stored at 624 in the application repository 614. In some embodiments, the configuration service 612 may update configuration management data or application registration data to include information regarding the deployment of the configuration artifact, such as the name and version of the configuration artifact, and the date and time of the deployment.

Figure 6B:
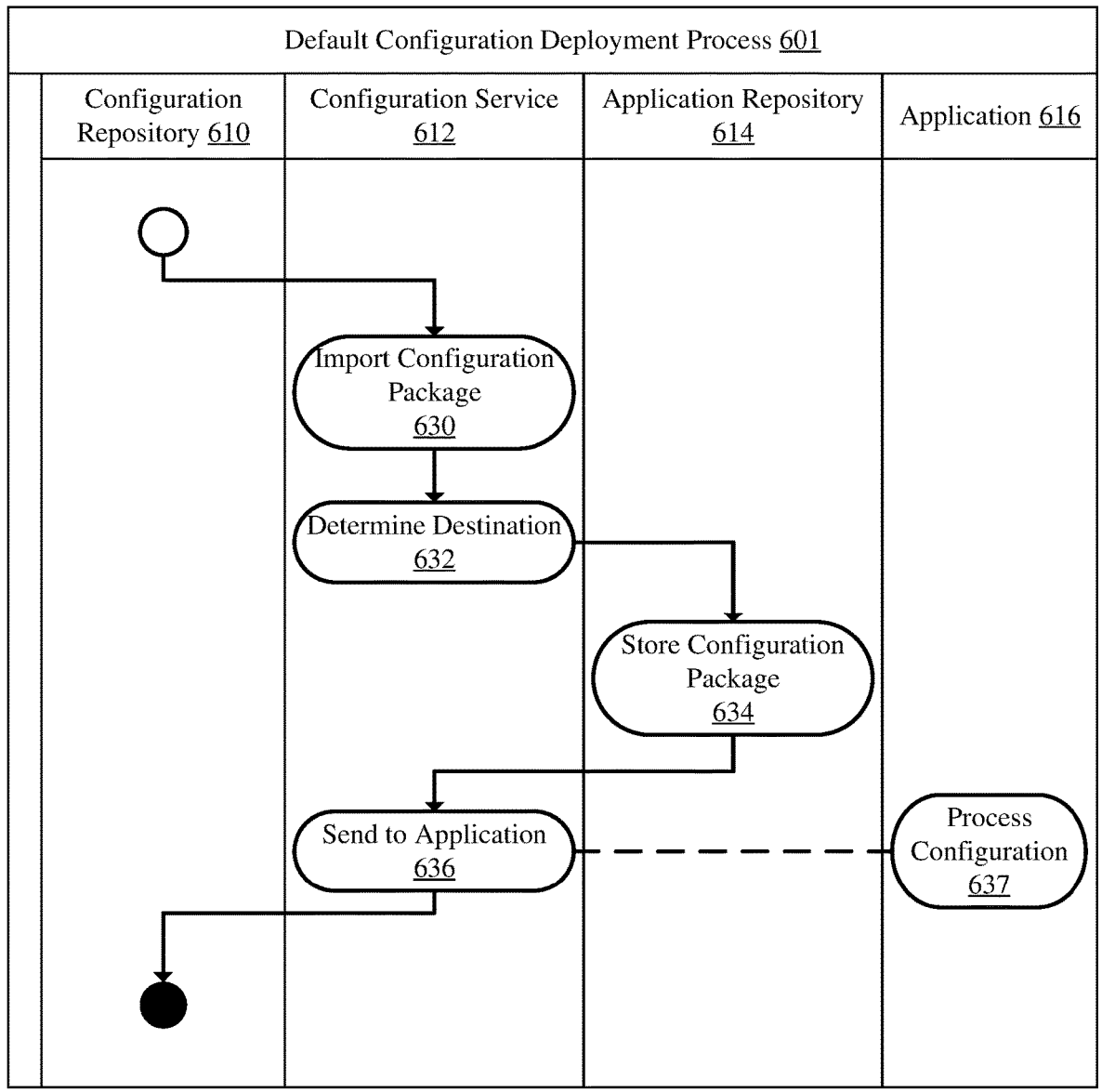
FIG. 6B is a flowchart illustrating a default configuration deployment process.

FIG. 6B is a flowchart illustrating a default configuration deployment process 601. Generally, this is a deployment of a configuration package to an application 616. The process 601 begins in a configuration repository 610 where the configuration package is stored. A configuration service 612 imports the configuration package at 630 for use in deployment. Next, the configuration service 612 determines the destination for the configuration package at 632. This may include consulting an internal registry for the location for the configuration artifact at the application. Alternatively, it may include querying the application itself 616 to determine the location to deploy the configuration package.

The configuration service then stores the configuration package at 634 in the determined application repository 614. Alternatively, the configuration service 612 may store the configuration artifact at 634 in a local location of the configuration service for use. The application repository 614 may be a network location, a file location, a database, a communication message receiver, a memory space, main memory or processing memory, or some other receiving location. The configuration service 612 may then send notice at 636 to the application 616 that the configuration package has been deployed. The application 616 may initiate any necessary procedures at 637 to begin utilizing the configuration package.

Generally, the process 601 ends once the application 616 is notified that the configuration package is stored in the application repository 614. In some embodiments, the configuration service 612 may update configuration management data or application registration data to include information regarding the deployment of the configuration package, such as the name and version of the configuration package, and the date and time of the deployment.

Figure 6C:
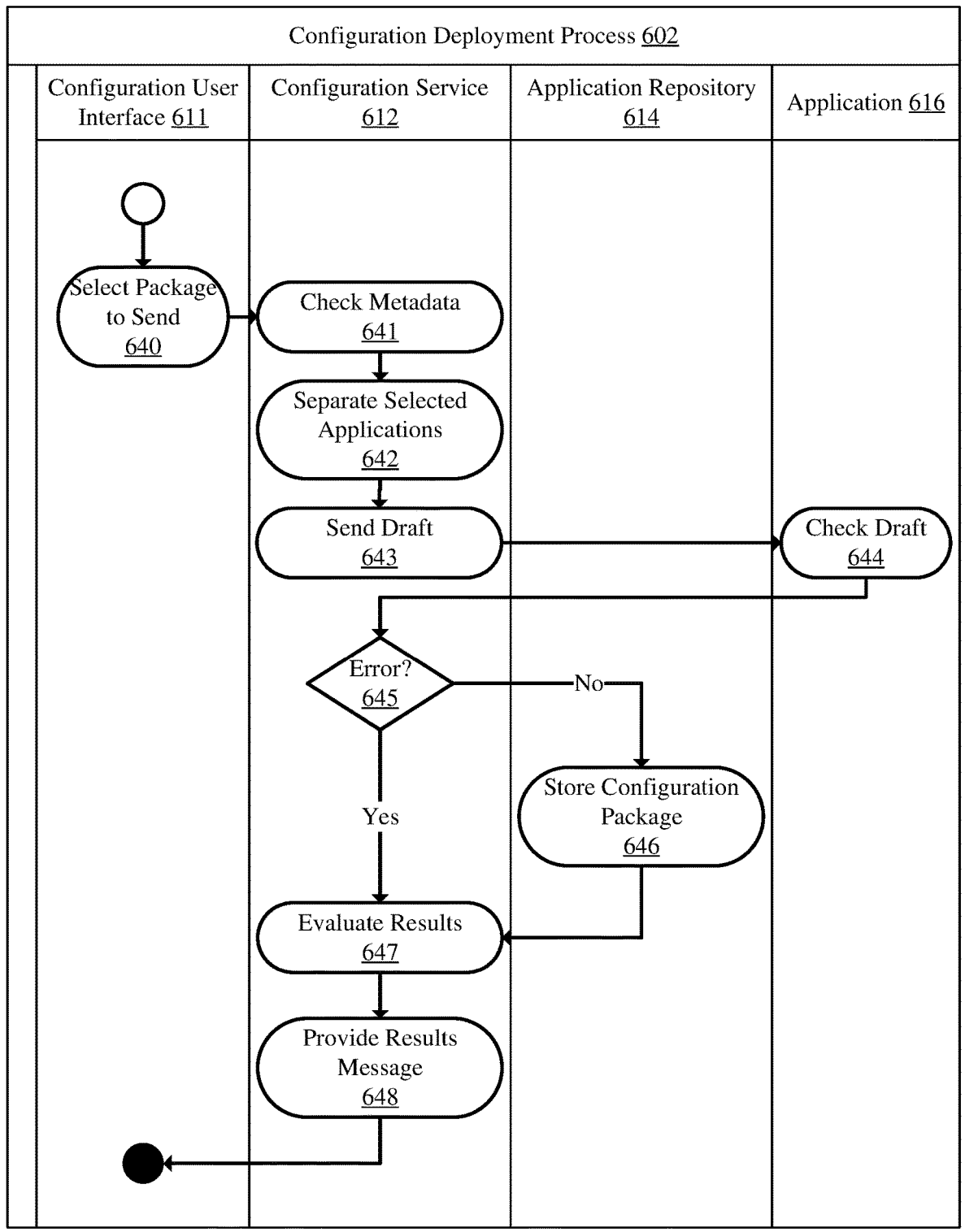
FIG. 6C is a flowchart illustrating an alternate configuration deployment process.

FIG. 6C is a flowchart illustrating an alternate configuration deployment process 602. Generally, this is a deployment of a configuration package to an application 616. The process 602 begins at a user interface 611 for the configuration service. A user may select a package to deploy or distribute at 640. The package may be a configuration model, a configuration artifact, configuration content, or any combination thereof. The user may also select multiple applications to which to send the package. The configuration service 612 then checks the metadata of the package at 641, resolving any dependencies or performing other tasks as indicated in the metadata.

The configuration service 612 may further determine at 642 the separate application to which the package is to be sent. This may include obtaining any necessary data for sending to the selected applications, such as from an application registry as described herein. The package may then be sent at 643 to each selected application as a draft package. The application 616 may then check at 644 the package, performing any necessary validation or verification checks and reporting the results back to the configuration service 612. If no error at 645 is found, the configuration service 612 may then store at 646 the package in the application repository 614 for the application 616; this may be done for each selected application. The configuration service 612 may then evaluate at 647 the results of the storage at 646. If an error was detected at 645 (reported from the check at 644), the configuration service 612 may then evaluate at 647 the results of the check at 644. Based on the evaluation at 647, the configuration service may then provide at 648 a results message or other pertinent information; this may be accomplished through a configuration service user interface, such as configuration user interface 611.

Example 16—Additional Example Processes

Figure 7A:
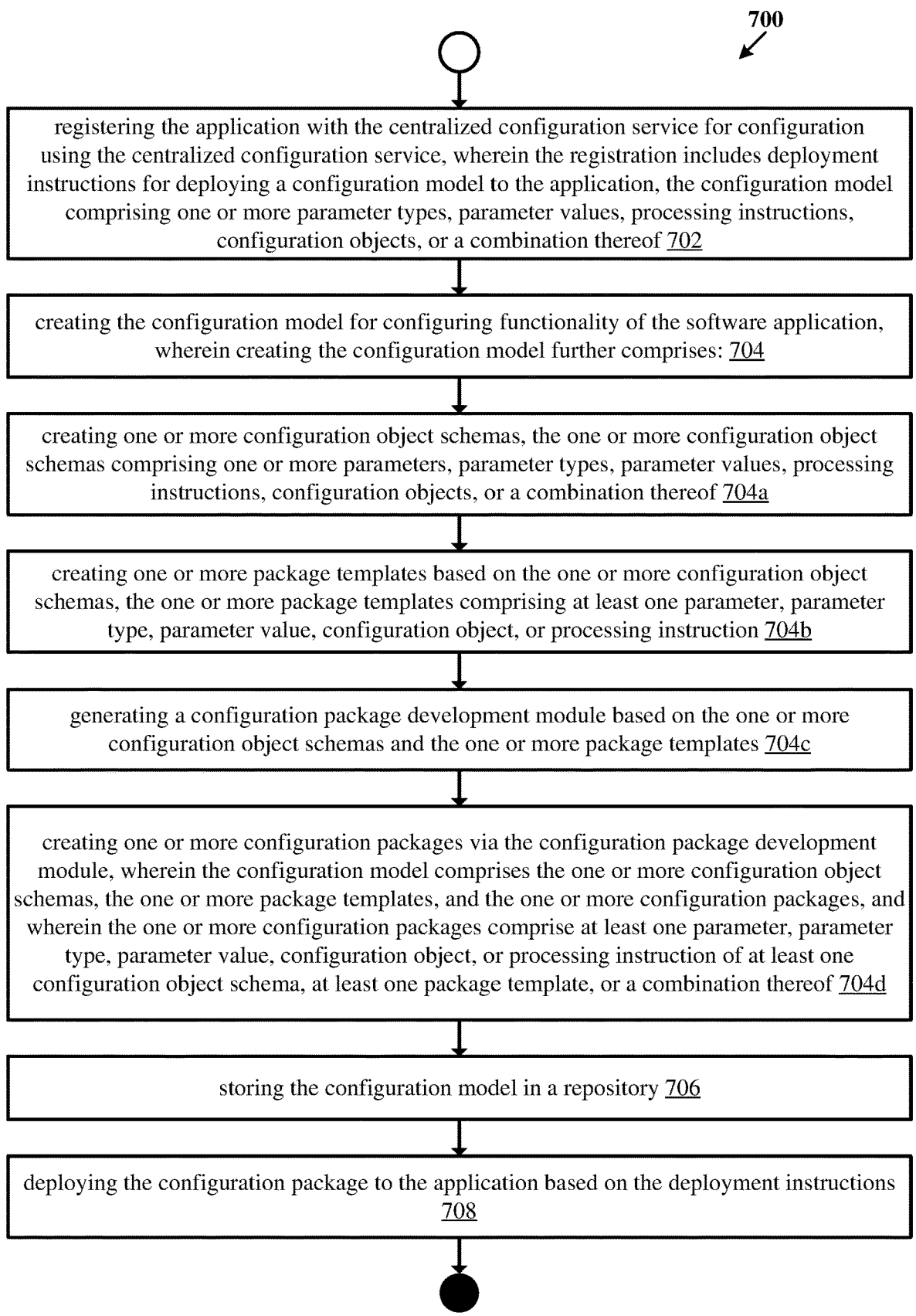
FIG. 7A is a flowchart illustrating a process for implementing the disclosed technologies.

FIG. 7A illustrates a method 700 for configuring the functionality of a software application using a centralized configuration service. An application may be registered with the centralized configuration service for configuration using the centralized configuration service at 702, where the registration includes deployment instructions for deploying a configuration model to the application, and the configuration model including one or more parameter types, parameter values, processing instructions, configuration objects, or a combination thereof. The configuration model for configuring functionality of the software application may be created at 704.

Creating the configuration model may include creating one or more configuration object schemas at 704a, the one or more configuration object schemas including one or more parameters, parameter types, parameter values, processing instructions, configuration objects, or a combination thereof. Creating the configuration model may further include creating one or more package templates based on the one or more configuration object schemas at 704b, the one or more package templates including at least one parameter, parameter type, parameter value, configuration object, or processing instruction. Creating the configuration model may further include generating a configuration package development module at 704c, based on the one or more configuration object schemas and the one or more package templates. Creating the configuration model may further include creating one or more configuration packages via the configuration package development module at 704d, where the configuration model includes the one or more configuration object schemas, the one or more package templates, and the one or more configuration packages, and where the one or more configuration packages includes at least one parameter, parameter type, parameter value, configuration object, or processing instruction of at least one configuration object schema, at least one package template, or a combination thereof.

The configuration model may be stored in a repository at 706. The configuration package may be deployed to the application based on the deployment instructions at 708.

Figure 7B:
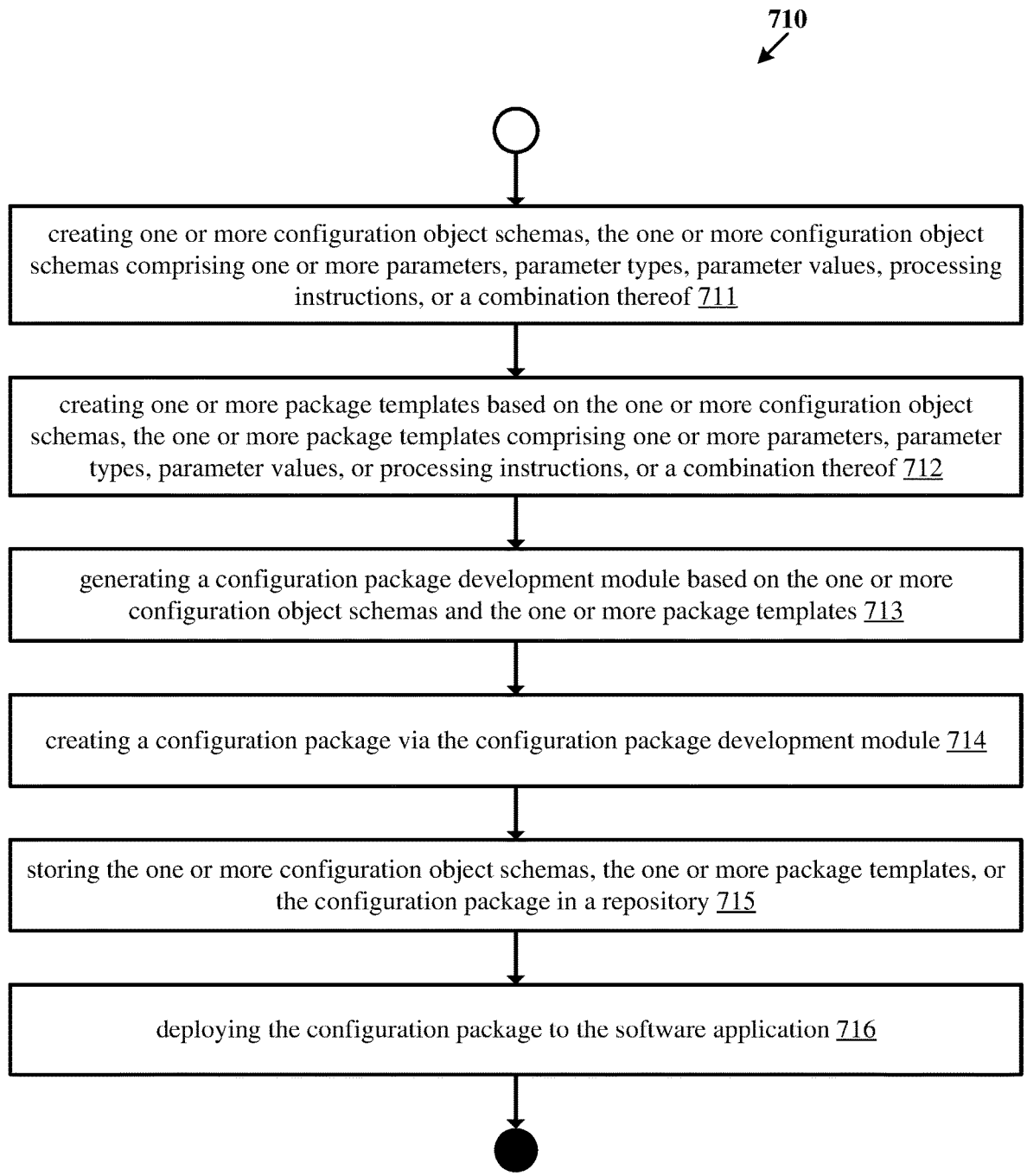
FIG. 7B is a flowchart illustrating an additional process for implementing the disclosed technologies.

FIG. 7B illustrates a method 710 in one or more non-transitory computer-readable storage media storing computer-executable instructions for causing a computing system to perform a method of configuring functionality of a software application using a centralized configuration service. One or more configuration object schemas are created at 711; the one or more configuration object schemas include one or more parameters, parameter types, parameter values, processing instructions, or a combination thereof. One or more package templates are created at 712 based on the one or more configuration object schemas; the one or more package templates include one or more parameters, parameter types, parameter values, or processing instructions, or a combination thereof. A configuration package development module is generated at 713 based on the one or more configuration object schemas and the one or more package templates. A configuration package is created at 714 via the configuration package development module. The one or more configuration object schemas, the one or more package templates, or the configuration package are stored at 715 in a repository. The configuration package is deployed at 716 to the software application.

Figure 7C:
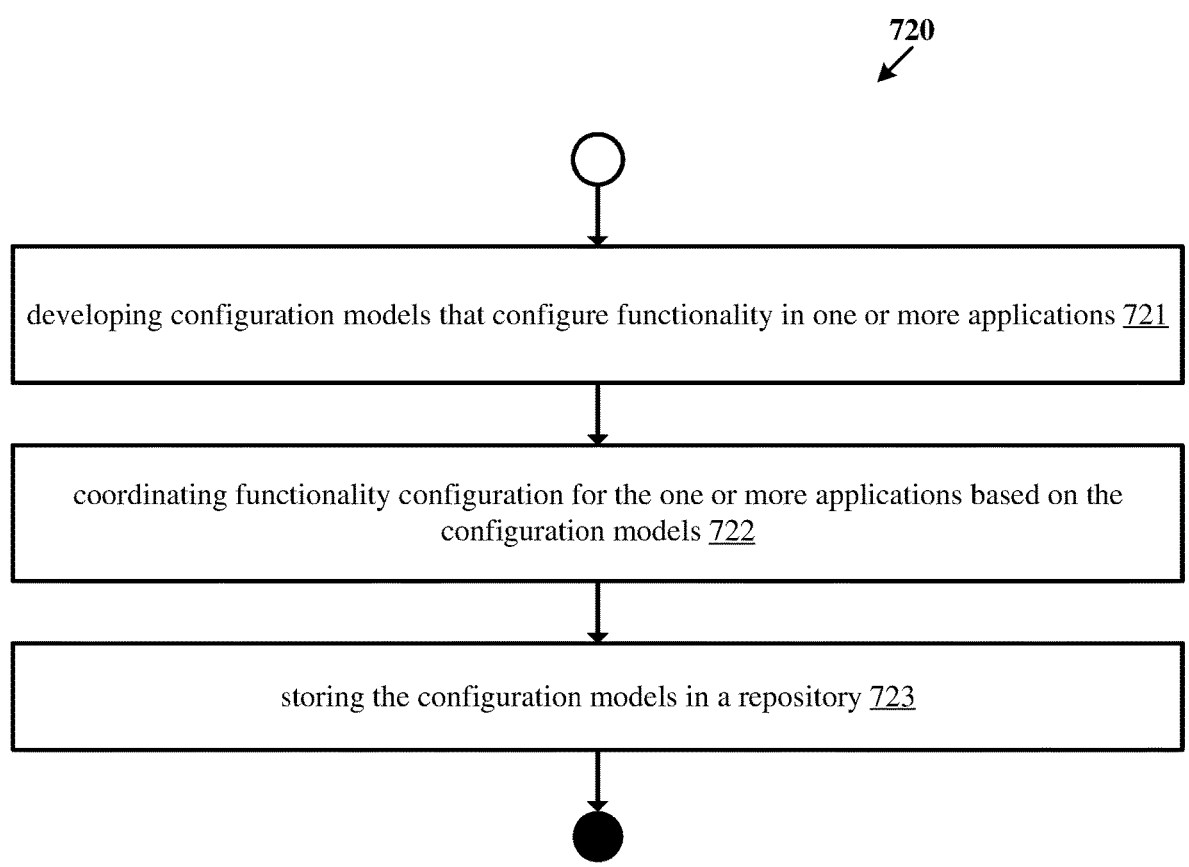
FIG. 7C is a flowchart illustrating a further additional process for implementing the disclosed technologies.

FIG. 7C illustrates operations 720 executable by a system, such as a computing system, for configuring functionality of a software application using a configuration service. Configuration models that configure functionality in one or more applications are developed at 721. Functionality configuration for the one or more applications based on the configuration models is coordinated at 722. Finally, the configuration models are stored at 723 in a repository.

Example 17—Code Lists

A configuration service as described herein may also be used for code lists. Code lists may be considered real world data, which is generally not functionality configuration data, and generally is not application dependent. Code lists may describe ISO codes, currencies, countries or regions, or units of measure. A configuration service may be used to manage, store, or distribute such code lists across multiple applications, in addition to configuration models, similar to how this is accomplished for configuration models herein. An application registered with the configuration service may have access to code lists available.

Code list functionality in the configuration service may include lifecycle development and management of code lists for applications that use the code lists. Thus, each code list may be specially adaptable for specific applications. This may include extensions to code lists. Alternatively, applications themselves may modified or extend code lists provided by the configuration service.

A dedicated push delivery may be supported for code lists; such a dedicated component may be separate from configuration model deploy/distribution components. A receiving application may select which code lists to receive, or may receive all available code lists.

Example 18—Master Data

A configuration service as described herein may also be used for master data. Master data is generally not functionality configuration data, and generally is not application dependent. Master data may describe plants/manufactories, business partners, projects, or materials. A configuration service may be used to manage, store, or distribute such master data across multiple applications, in addition to configuration models, similar to how this is accomplished for configuration models herein. An application registered with the configuration service may have access to master data available. Further, specific master data may be made accessible only by specified applications. Applications may provide explicit information or requests for any given master data available.

Master data functionality in the configuration service may include lifecycle development and management of master data for applications that use the master data. Thus, master data may be specially adaptable for specific applications. This may include extensions to the master data. Alternatively, applications themselves may modified or extend master data provided by the configuration service.

Example 19—Configuration Service Advantages

A configuration service as described herein provides many advantages. The configuration service allows for centralized development or management of configuration models that can be used across multiple applications. It further allows for reuse of configuration models, or individual configuration artifacts, but storing and maintaining the configuration models and artifacts.

Such centralization and reuse enables and encourages utilizing unified definitions for functionality configuration, which may increase interoperability of applications. This is particularly useful for applications that are composed of multiple microservices, each of which may require configuration models but which must be compatible with the other related microservices. Further, in some instances, particular functionality may be implemented across several applications (e.g. such as across several related microservices) and so a unified configuration model to configuration the functionality is necessary; the configuration service may improve the ability to provide such a unified configuration model. Further, maintaining versions of configuration models may allow for faster regression in the case of error or other problems arising from a configuration model.

Providing a repository of configuration models and configuration artifacts may increase the speed or efficiency of developing functionality configuration for new or expanding applications, by using already existing models or artifacts. Further, using modeling in place of coding functionality in applications allows for more flexible applications.

The configuration service may provide standardized deployment or distribution of configuration models and content, which can simplify the deployment process or updates to applications by using a controlled, known process through the configuration service. Further, the configuration service may provide a centralized, standardized interface for developing configuration models and artifacts, which can improve efficiency (both reducing time and error-rate) of the development process.

Moving functionality configuration into a configuration model, rather than directly coding into an application, allows for changes to the functionality of an application without requiring re-coding or new development of the application. This may also allow non-developers to make changes, such as key users or other people familiar with the functionality but not necessarily with coding or software.

Example 20—Computing Systems

Figure 8:
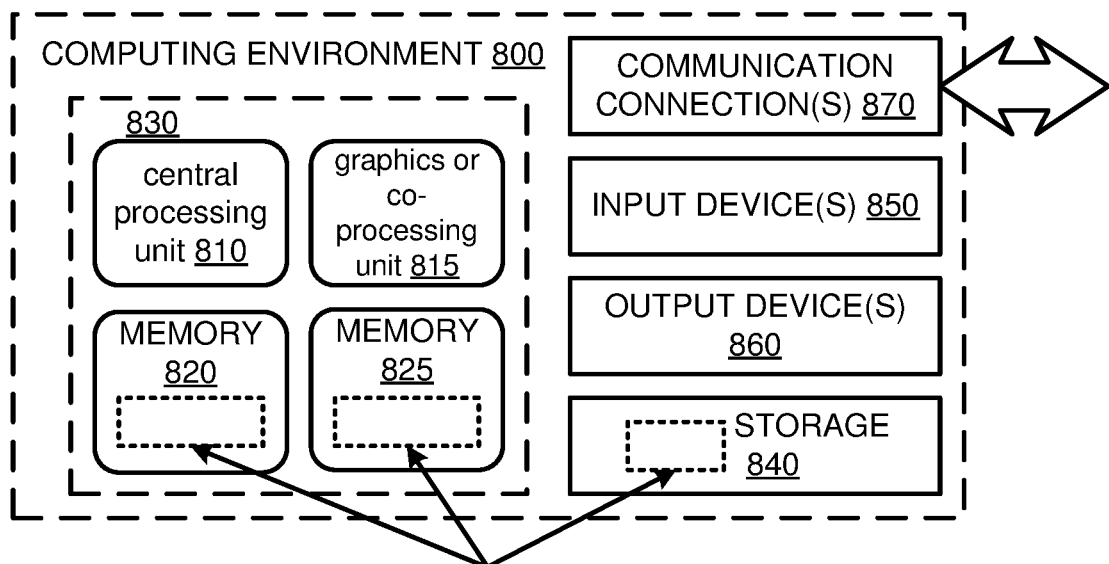
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 4, 5A-C, 6A-B, or 7A-C, or the systems of FIGS. 2A-B or 3A-C, or the configuration models and artifacts of FIGS. 1A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, such as data associated with settings in the configuration service system in storage 216 as shown in FIG. 2A.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21—Cloud Computing Environment

Figure 9:
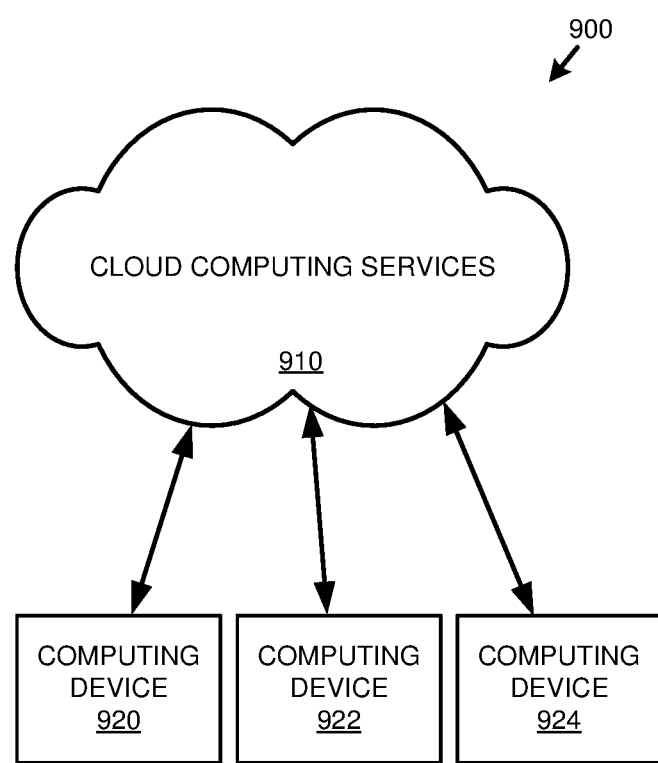
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 22—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system comprising at least one hardware processor and at least one memory coupled to the at least one hardware processor, comprising:
    creating a first configuration model for configuring functionality of a first software application, wherein creating the first configuration model comprises:
        receiving first user input defining first and second configuration object schemas;
        creating the first and second configuration object schemas according to the first user input, wherein a configuration object schema comprises configuration content comprising one or more parameters, parameter types, parameter values, processing instructions, configuration objects, or a combination thereof, and wherein at least one of the first configuration object schema or the second configuration object schema comprises a plurality of parameters, parameter types, parameter values, processing instructions, configuration objects, or a combination thereof;
        storing the first and second configuration object schemas as software objects in a first repository to provide stored first and second configuration object schemas;
        receiving second user input to include the stored first and second configuration object schemas in a first package template;
        creating the first package template at least in part by incorporating the configuration content of the stored first and second configuration object schemas into configuration content of the first package template,
        generating a configuration package development module based at least in part on the first and second configuration object schemas and at least the first package template, and
        creating a first configuration package via the configuration package development module at least in part by incorporating the configuration content of the first package template into the first configuration package;
    storing the first configuration model in a second repository, where the second repository is the first repository or is a repository different than the first repository;
    deploying the first configuration package to the first software application; and
    creating a second configuration model for configuring functionality of a second software application, wherein the second software application is the first software application or is a software application different than the first software application, and wherein creating the second configuration model comprises:
        receiving third user input defining a second package template; and
        creating a second package template according to the third user input at least in part by incorporating the configuration content of the stored first configuration object schema and a stored third configuration object schema into contents of the second package template, wherein the second package template is different than the first package template and the stored third configuration object schema is not included in the first package template.

2. The method of claim 1, wherein the creating a first configuration package comprises providing a user interface configured to allow a user to edit one or more of the first package template, the first configuration object schema, or the second configuration object schema.

3. The method of claim 2, wherein the user interface is generated based on configuration content of one or more of the first package template, the first configuration object schema, or the second configuration object schema.

4. The method of claim 3, wherein the user interface is configured to allow a user to edit the first configuration package, including allowing a user to edit at least one of a parameter, parameter type, parameter value, configuration object, or processing instruction of the first configuration package.

5. The method of claim 1, wherein the method is implemented in a centralized configuration service, the method further comprising:
    registering the first software application and the second software application with the centralized configuration service, the registering comprising deployment instructions specifying how the first configuration model should be deployed to the first software application, wherein the deploying the first configuration package is carried out in accordance with the deployment instructions.

6. One or more non-transitory computer-readable storage media storing computer-executable instructions that, when executed, cause a computing system to perform operations comprising:
   receiving user input defining first and second configuration object schemas;
   creating the first and second configuration object schemas according to the user input, wherein a configuration object schema comprises configuration content comprising one or more parameters, parameter types, parameter values, processing instructions, or a combination thereof, and wherein at least one of the first configuration object schema or the second configuration object schema comprises a plurality of parameters, parameter types, parameter values, processing instructions, configuration objects, or a combination thereof;
   storing the first and second configuration object schemas as software objects in a first repository to provide stored first and second configuration object schemas;
   creating first and second package templates at least in part by incorporating the configuration content of the first configuration object schema into configuration content of the first package template and into configuration content of the second package template, wherein the second package template further incorporates configuration content of the second configuration object schema and the first package template does not incorporate configuration content of the second stored configuration object schema;
   generating a configuration package development module based at least in part on the first and second configuration object schemas and at least the second package template;
   creating a configuration package via the configuration package development module;
   storing the first and second package templates or the configuration package in a second repository, where the second repository is the first repository or is a repository different than the first repository; and
   deploying the configuration package to a software application.

7. The one or more non-transitory computer-readable storage media of claim 6, wherein the creating the configuration package comprises providing a user interface configured to allow a user to edit one or more of the second package template, the first configuration object schema, or the second configuration object schema.

8. The one or more non-transitory computer-readable storage media of claim 7, wherein the user interface is generated based on configuration content of one or more of the second package template, the first configuration object schema, or the second configuration object schema.

9. The one or more non-transitory computer-readable storage media of claim 8, wherein the user interface is configured to allow a user to edit the configuration package, including allowing the user to edit at least one of a parameter, parameter type, parameter value, configuration object, or processing instruction of the configuration package.

10. A computing system comprising:
    one or more memories;
    one or more hardware processing units coupled to the one or more memories; and
    one or more computer readable storage media storing instructions that, when executed, cause the computing system to perform operations comprising:
       receiving user input defining first and second configuration object schemas;
       creating first and second configuration object schemas according to the user input, wherein a configuration object schema comprises configuration content comprising one or more parameters, parameter types, parameter values, processing instructions, or a combination thereof, and wherein at least one of the first configuration object schema or the second configuration object schema comprises a plurality of parameters, parameter types, parameter values, processing instructions, configuration objects, or a combination thereof;
       storing the first and second configuration object schemas as software objects in a first repository to provide stored first and second configuration object schemas;
       creating a first package template at least in part by incorporating the configuration content of the stored first configuration object schema into configuration content of the first package template, wherein the first package template does not incorporate the configuration content of the second stored configuration object schema;
       creating a second package template at least in part by incorporating the configuration content of the stored first configuration object schema and the configuration content of the stored second configuration object schema into configuration content of the second package template;
       generating a configuration package development module based at least in part on the stored first and second configuration object schemas and at least the second package template;
       creating a configuration package via the configuration package development module;
       storing the first and second package templates or the configuration package in a second repository, where the second repository is the first repository or is a repository different than the first repository; and
       deploying the configuration package to a software application.

11. The computing system of claim 10, the operations further comprising:
    creating a configuration model, wherein the configuration model comprises the first and second configuration object schemas, the first package template, the second package template, and the configuration package.

12. The computing system of claim 10, the operations further comprising:
    maintaining application data for the software application in an application registry, wherein the deploying the configuration package is based at least in part on the application data.

13. The computing system of claim 10, the operations further comprising:
    deploying one or more of the second package template, the first configuration object schema, or the second configuration object schema to the software application.

14. The computing system of claim 10, the operations further comprising:

providing a user interface configured to allow a user to edit one or more of the second package template, the first configuration object schema, or the second configuration object schema.

15. The computing system of claim 14, wherein the user interface is generated based on configuration content of one or more of the second package template, the first configuration object schema, or the second configuration object schema.

16. The computing system of claim 15, wherein the user interface is configured to allow a user to edit the configuration package, including allowing the user to edit at least one of a parameter, parameter type, parameter value, configuration object, or processing instruction of the configuration package.

17. The computing system of claim 10, wherein a method or parameter of the software application is configured using an attribute of the first configuration object schema.

18. The computing system of claim 10, wherein an attribute of the first configuration object schema comprises a parameter value.

19. The computing system of claim 10, wherein an attribute of the first configuration object schema comprises a parameter type associated with a user-configurable value.

20. The computing system of claim 10, wherein the first and second configuration object schemas are instances of a configuration object schema data type.

* * * * *